US011660762B2

(12) United States Patent
Holopainen et al.

(10) Patent No.: US 11,660,762 B2
(45) Date of Patent: May 30, 2023

(54) WASTE SORTING ROBOT

(71) Applicant: MP ZenRobotics Oy, Vantaa (FI)

(72) Inventors: Harri Holopainen, Espoo (FI); Tuomas Lukka, Helsinki (FI)

(73) Assignee: MP ZENROBOTICS OY, Helsinki (FI)

( * ) Notice: Subject to any disclaimer, the term of this patent is extended or adjusted under 35 U.S.C. 154(b) by 0 days.

(21) Appl. No.: 17/051,422

(22) PCT Filed: Apr. 18, 2019

(86) PCT No.: PCT/FI2019/050322
§ 371 (c)(1),
(2) Date: Oct. 28, 2020

(87) PCT Pub. No.: WO2019/215384
PCT Pub. Date: Nov. 14, 2019

(65) Prior Publication Data
US 2021/0237260 A1    Aug. 5, 2021

(30) Foreign Application Priority Data

May 11, 2018   (SE) .................................. 1830158-0

(51) Int. Cl.
*B25J 15/06*         (2006.01)
*B25J 9/00*          (2006.01)
(Continued)

(52) U.S. Cl.
CPC ......... *B25J 15/0616* (2013.01); *B25J 9/0051* (2013.01); *B25J 9/0093* (2013.01);
(Continued)

(58) Field of Classification Search
CPC ........ B25J 9/0051; B25J 9/0093; B25J 9/026; B25J 13/085; B25J 13/088; B25J 15/0616; B65G 47/917; G05B 19/4182
See application file for complete search history.

(56) References Cited

U.S. PATENT DOCUMENTS

| 4,679,291 A | 7/1987 | Schmeal et al. |
| 4,763,941 A | 8/1988 | Sniderman |

(Continued)

FOREIGN PATENT DOCUMENTS

| CN | 101508181 | 4/2011 |
| CN | 102431787 | 5/2012 |

(Continued)

OTHER PUBLICATIONS

International Search Report and Written Opinion issued in PCT/FI2019/050322 dated Aug. 28, 2019.

(Continued)

*Primary Examiner* — Dale Moyer
(74) *Attorney, Agent, or Firm* — Knobbe, Martens, Olson & Bear, LLP

(57) ABSTRACT

A waste sorting robot can include a manipulator comprising a suction gripper for interacting with one or more waste objects to be sorted within a working area, and wherein the manipulator is moveable within the working area. There is a controller configured to send control instructions to the manipulator. At least one pressure sensor is in fluid communication with the suction gripper and configured to generate a pressure signal in dependence on a fluid pressure in the suction gripper. The controller is configured to receive the pressure signal and to determine manipulator instructions in dependence on the pressure signal.

20 Claims, 11 Drawing Sheets

(51) Int. Cl.
  *B65G 47/91* (2006.01)
  *G05B 19/418* (2006.01)
  *B25J 9/02* (2006.01)
  *B25J 13/08* (2006.01)

(52) U.S. Cl.
  CPC ....... *B65G 47/917* (2013.01); *G05B 19/4182* (2013.01); *B25J 9/026* (2013.01); *B25J 13/085* (2013.01); *B25J 13/088* (2013.01)

(56) References Cited

U.S. PATENT DOCUMENTS

| | | | |
|---|---|---|---|
| 4,998,442 | A | 3/1991 | Brown et al. |
| 5,188,411 | A | 2/1993 | Golden |
| 5,244,242 | A | 9/1993 | Goedecke et al. |
| 5,423,431 | A | 6/1995 | Westin |
| 5,572,785 | A | 11/1996 | Tveit |
| 5,617,338 | A | 4/1997 | Sugano |
| 5,617,898 | A | 4/1997 | Nagai |
| 5,626,378 | A | 5/1997 | Puhi et al. |
| 5,636,966 | A | 6/1997 | Lyon et al. |
| 5,733,098 | A | 3/1998 | Lyon et al. |
| 5,735,782 | A | 4/1998 | Berg |
| 5,884,664 | A * | 3/1999 | Nagai ............. F15B 13/0896 137/884 |
| 5,934,864 | A | 8/1999 | Lyon et al. |
| 5,992,691 | A | 11/1999 | Post et al. |
| 6,024,392 | A | 2/2000 | Blatt |
| 6,256,553 | B1 | 7/2001 | Erikkila |
| 6,817,639 | B2 | 11/2004 | Schmalz et al. |
| 8,777,284 | B2 | 7/2014 | Schaller et al. |
| 8,880,217 | B2 | 11/2014 | Izumi et al. |
| 9,082,454 | B2 | 7/2015 | Yao et al. |
| 9,205,558 | B1 * | 12/2015 | Zevenbergen ....... B25J 15/0052 |
| 9,272,417 | B2 | 3/2016 | Konolige et al. |
| 9,486,926 | B2 | 11/2016 | Kawano |
| 9,600,798 | B2 | 3/2017 | Battles et al. |
| 9,914,213 | B2 | 3/2018 | Vijayanarasimhan et al. |
| 10,449,572 | B2 | 10/2019 | Ripley |
| 10,464,105 | B2 | 11/2019 | Koistinen et al. |
| 10,482,120 | B2 | 11/2019 | Ripley |
| 10,576,630 | B1 | 3/2020 | Diankov et al. |
| 10,639,790 | B1 | 5/2020 | Bacon et al. |
| 2003/0012925 | A1 | 1/2003 | Gorrell |
| 2003/0133775 | A1 | 7/2003 | Specher |
| 2004/0094979 | A1 | 5/2004 | Damhuis |
| 2005/0200142 | A1 * | 9/2005 | Isetani ............. H05K 13/0409 294/185 |
| 2005/0218677 | A1 | 10/2005 | Llich |
| 2006/0053624 | A1 | 3/2006 | Maeda et al. |
| 2011/0076128 | A1 | 3/2011 | Johnsen |
| 2012/0032461 | A1 | 2/2012 | Hukelmann |
| 2012/0032491 | A1 | 2/2012 | Hukelmann et al. |
| 2013/0127194 | A1 | 5/2013 | Regan et al. |
| 2014/0025197 | A1 | 1/2014 | Mattern |
| 2014/0062112 | A1 | 3/2014 | Ho-Young |
| 2015/0016933 | A1 | 1/2015 | Ochiishi |
| 2015/0241203 | A1 * | 8/2015 | Jordil ............... G01B 5/0004 356/4.01 |
| 2015/0328779 | A1 | 11/2015 | Bowman et al. |
| 2016/0332310 | A1 | 11/2016 | Conall |
| 2017/0028562 | A1 | 2/2017 | Yamazaki et al. |
| 2017/0073174 | A1 | 3/2017 | Tanaka |
| 2017/0174439 | A1 | 6/2017 | Ripley |
| 2017/0291308 | A1 | 10/2017 | Junichi |
| 2017/0355083 | A1 | 12/2017 | Wigren |
| 2018/0036774 | A1 | 2/2018 | Lukka et al. |
| 2018/0050451 | A1 | 2/2018 | Takanishi et al. |
| 2019/0030571 | A1 | 1/2019 | Horowitz et al. |
| 2019/0061174 | A1 * | 2/2019 | Robinson ............. B65H 29/32 |
| 2019/0084012 | A1 * | 3/2019 | McCoy, Jr. ......... B25J 15/0675 |
| 2019/0130560 | A1 | 5/2019 | Horowitz et al. |
| 2019/0143536 | A1 * | 5/2019 | Tell ............... B25J 15/0675 294/64.3 |
| 2019/0217342 | A1 | 7/2019 | Parr et al. |
| 2020/0048015 | A1 | 2/2020 | Martin et al. |
| 2020/0077074 | A1 | 3/2020 | Denenberg et al. |
| 2020/0087118 | A1 | 3/2020 | Sato et al. |
| 2021/0061588 | A1 | 3/2021 | Lukka et al. |

FOREIGN PATENT DOCUMENTS

| | | |
|---|---|---|
| CN | 203212009 | 9/2013 |
| CN | 103787059 | 5/2014 |
| CN | 204057223 | 12/2014 |
| CN | 104513012 | 4/2015 |
| CN | 104589351 | 5/2015 |
| CN | 105196302 | 12/2015 |
| CN | 105215076 | 1/2016 |
| CN | 105372510 | 3/2016 |
| CN | 107363405 | 11/2017 |
| CN | 107650139 | 2/2018 |
| CN | 107738264 | 2/2018 |
| CN | 106362957 | 5/2018 |
| CN | 108032324 | 5/2018 |
| CN | 108971190 | 12/2018 |
| CN | 109013384 | 12/2018 |
| CN | 109176522 | 1/2019 |
| CN | 109249402 | 1/2019 |
| CN | 109433633 | 3/2019 |
| CN | 110116415 | 8/2019 |
| CN | 209866708 | 12/2019 |
| DE | 2455284 | 5/1976 |
| DE | 4440748 A1 | 5/1996 |
| DE | 102010029662 | 12/2011 |
| DE | 102015220413 | 4/2017 |
| DK | 3056289 | 1/2019 |
| EP | 0253229 | 1/1988 |
| EP | 0706838 | 4/1996 |
| EP | 1918479 | 5/2008 |
| EP | 2476813 | 7/2012 |
| EP | 2585256 | 5/2013 |
| EP | 2694224 | 2/2014 |
| EP | 2758216 | 7/2014 |
| EP | 2810901 | 3/2016 |
| EP | 3056288 | 8/2016 |
| EP | 3056289 | 8/2016 |
| EP | 3236083 | 10/2017 |
| EP | 3254998 | 12/2017 |
| EP | 3496873 | 6/2019 |
| EP | 3626412 | 3/2020 |
| EP | 3658302 | 6/2020 |
| EP | 3672764 | 7/2020 |
| EP | 3674040 | 7/2020 |
| EP | 3677388 | 7/2020 |
| GB | 2325915 | 12/1998 |
| GB | 2354752 A | 4/2001 |
| IT | MI20 081 360 | 1/2010 |
| JP | S5045304 | 4/1975 |
| JP | 61-249292 | 11/1986 |
| JP | H01 240287 | 9/1989 |
| JP | H03154793 | 7/1991 |
| JP | H05318369 | 12/1993 |
| JP | H0630857 | 4/1994 |
| JP | H0740273 | 2/1995 |
| JP | 05089337 | 12/1996 |
| JP | H092682 | 1/1997 |
| JP | 9131575 | 5/1997 |
| JP | 10-202571 | 8/1998 |
| JP | H11198076 | 7/1999 |
| JP | 201138280 | 5/2001 |
| JP | 2002301683 | 10/2002 |
| JP | 2007040273 | 2/2007 |
| JP | 4947691 | 6/2012 |
| JP | 2012115916 | 6/2012 |
| JP | 2013252568 | 12/2013 |
| JP | 2014516810 | 4/2014 |
| JP | 5688924 | 3/2015 |
| JP | 2016068034 | 5/2016 |
| JP | 2016225336 | 12/2016 |
| JP | 2020022929 | 2/2020 |
| JP | 2020062633 | 4/2020 |
| KR | 20190050145 | 5/2019 |
| KR | 20190071387 | 6/2019 |

(56) References Cited

FOREIGN PATENT DOCUMENTS

| | | |
|---|---|---|
| SU | 1 399 116 | 5/1988 |
| WO | WO 89/12019 | 12/1989 |
| WO | WO 9524544 A1 | 9/1995 |
| WO | WO 98/19799 | 5/1998 |
| WO | WO2008/102052 | 8/2008 |
| WO | WO2011/161304 | 12/2011 |
| WO | WO2012/052615 | 4/2012 |
| WO | WO2012/089928 | 7/2012 |
| WO | WO2012/156579 | 11/2012 |
| WO | WO2013/068115 | 5/2013 |
| WO | WO 2014/202998 | 12/2014 |
| WO | WO 2016/070412 | 5/2016 |
| WO | WO 19/056102 | 3/2019 |
| WO | WO 2019/207202 | 10/2019 |
| WO | WO 2019/215384 | 11/2019 |
| WO | WO 2020/053195 | 3/2020 |
| WO | WO2020/079125 | 4/2020 |
| WO | WO 2020/082176 | 4/2020 |

OTHER PUBLICATIONS

International Search Report and Written Opinion of PCT/FI2019/050319, dated Jul. 29, 2019, in 17 pages.
International Search Report and Written Opinion issued in PCT/FI2019/050320 dated Jul. 30, 2019.
International Search Report and Written Opinion of PCT/FI2019/050321, dated Jul. 30, 2019, in 13 pages.
Extended European Search Report issued in PCT/FI2019/050322 dated Mar. 29, 2022.
Supplemental Extended European Search Report issued in PCT/FI2019/050322 dated Aug. 31, 2022.

* cited by examiner

WASTE SORTING ROBOT

TECHNICAL FIELD

The present invention relates to a waste sorting robot for sorting waste objects.

BACKGROUND

In the waste management industry, industrial and domestic waste is increasingly being sorted in order to recover and recycle useful components. Each type of waste, or "fraction" of waste can have a different use and value. If waste is not sorted, then it often ends up in landfill or incineration which has an undesirable environmental and economic impact.

Industrial waste may be passed to waste management centres because handling and disposing of waste is time consuming and requires specialist equipment. Accordingly, a waste management centre may sort waste to collect the most valuable and useful fractions. For example, industrial waste may include mixed wood and metal fractions (as well as other fractions) and sorted wood and metal fractions can be reused and sold to recyclers. Waste which is sorted into a substantially homogeneous fraction is more desirable and economical for recyclers. This is because less processing of the material is required before being recycled into new products and materials.

It is known to sort domestic and industrial waste in different ways. For many years waste has been manually sorted by hand on a conveyor belt. However hand sorting waste can be arduous and dangerous to the human sorter depending on the type of industrial or domestic waste being sorted. Furthermore, some waste sorting plants which use human sorters require multiple shifts in order to increase the output of sorted waste.

One approach for improving the safety and the output of waste sorting is to automate one or more aspects of the waste sorting. The automation can comprise a controller sending control and movement instructions to a manipulator for interacting with the physical objects. The combination of a controller sending control instructions to a manipulator can also be referred to as a "robot".

One such robotic waste sorting system is a "delta" robot suspended over a conveyor belt which moves objects to be sorted. The conveyor belt passes under the delta robot and within a working area of the delta robot. A working area of a robot is an area on a surface within which the robot is able to reach and manipulate an object. A working volume is the physical space within which the robot is able to move and manipulate an object. The working volume is determined by the height above the working area where the robot can manipulate an object. The working volume/area can also include chutes which are not part of the surface of a conveyor belt.

A delta robot comprises a servo housing and a plurality of arms which are connected to one or more servos for moving the arms. The arms extend down from the servo housing to a base which is coupled to a manipulator. The arms are connected via universal joints at the base.

Whilst a delta robot can be relatively effective at picking small light objects, the delta robot is not suitable for lifting heavy objects. Furthermore since the manipulator is suspended from the servo housing, the servos must have sufficient power to move the manipulator and the object. This means that the manipulators coupled to delta robots must be as light as possible to increase the maximum lift capacity of the delta robot.

Disadvantageously, the dimensions of the working volume for a delta robot varies across the width of the working space. In particular, the working volume is an inverted cone and becomes narrower as the manipulator moves away from the servo housing. In practice, this may mean that a delta robot cannot manipulate objects at the same height across the width of a conveyor belt and that delta robots are only suitable for working with narrow conveyor belts. This can be problematic because objects can be piled on each other making identifying and picking objects harder. This can limit the design choices and use applications when using a delta robot for waste sorting.

A delta robot is not particularly robust and the universal joints of a delta robot are particularly susceptible to wear and malfunction. Another consideration of a delta robot is that the movement of one or more arms causes movement in the other arms. Accordingly, whenever a delta robot moves, control instructions must be sent to each servo because each arm must move when the manipulator of the delta robot is moved. The non-linear control instructions to move the arms of the delta robot means that increased computational processing is required to control and move the delta robot within the working area/working volume.

Another known robot for automatic sorting of waste is a "gantry" robot. A gantry robot comprises a frame or gantry which engages the floor and bridges over a working area such as a conveyor belt. The gantry supports the weight of the manipulator and an object that the manipulator grips. The gantry robot comprises one or more axes of control which move in a straight line (e.g. linear). Normally the axes of control of a gantry robot are arranged at right angles to each other.

A gantry robot may pick objects from the conveyor belt and drop the picked objects into a chute. A chute comprises an opening which is in communication with a bin or another conveyor belt for receiving a particular fraction of waste. The picked objects placed in the bin or on the conveyor belt can then be moved to another location or step in waste processing. This means a picked object of a certain waste fraction is dropped into the corresponding chute. Known gantry robots may have a four or more chutes located at the four corners of the rectangular working space for receiving the different fractions.

It is known for automatic robotic sorting systems to use finger grippers or other articulated jaws for gripping objects to be sorted. A problem with finger grippers is that they have a specific plane in which the fingers or jaws close. This means that in order to successfully grip objects on a conveyor belt, the finger gripper or jaws must rotate. The rotation requires a rotation servo which increases the weight and complexity of the manipulator.

A known alternative gripper is a suction gripper which uses negative pressure with respect to atmospheric pressure for sucking and gripping an object to be sorted. Suction grippers can become blocked which can adversely affect performance. Manual visual inspection may be required to check whether the suction gripper is operating correctly when the suction gripper repeatedly fails to grip an object.

SUMMARY

Embodiments of the present invention aim to address the aforementioned problems.

According to an aspect of the present invention, there is a waste sorting robot comprising: a manipulator comprising a suction gripper for interacting with one or more waste objects to be sorted within a working area, and wherein the manipulator is moveable within the working area; a controller configured to send control instructions to the manipulator; and at least one pressure sensor in fluid communication with the suction gripper and configured to generate a pressure signal in dependence on a fluid pressure in the suction gripper; at least one position sensor configured to generate a position signal in dependence of the position of the manipulator and/or the suction gripper; wherein the controller is configured to receive the pressure signal and the position signal and to determine manipulator instructions in dependence on the pressure signal and the position signal.

This means that the waste sorting robot can control the suction gripper and the manipulator in dependence of the pressure of the suction gripper. This means that the controller can adapt and react to differences in pressure at the suction gripper and become more reliable. Accordingly, the waste sorting robot has a greater chance of making successful picks.

Optionally, the at least one pressure sensor is mounted on the suction gripper. This means that the pressure sensor is proximal to the suction gripper and the pressure at the suction gripper is precisely measured by the pressure sensor. Small variations in the pressure at the suction gripper can be measured accurately.

Optionally, the at least one pressure sensor is configured to measure the pressure in a suction cup of the suction gripper. In this way, the pressure sensor measures the lifting force of the suction gripper. The controller can adapt and react to changes in the determined lifting force of the suction gripper.

Optionally, the controller is configured to detect whether the pressure in the suction gripper is below a threshold suction pressure, the rate of change of the pressure rises above a threshold change rate, signal processing on the pressure signal, and/or filtering on the pressure signal. This means that the controller knows when a parameter the suction gripper has changed. Optionally, the controller determines a suction gripper status in dependence on the pressure signal.

Optionally, the controller determines a suction gripper status in dependence on a position of the manipulator and/or the suction gripper. The controller may determine a status of the suction gripper based on the position and the pressure of the suction gripper. In this way, the controller can distinguish between different suction gripper actions or statuses which have the same pressure magnitude or pressure profile. Optionally the controller may be connected to one or more sensors for determining the position of the manipulator and/or the suction gripper. Optionally the position sensor may be an encoder in a servo, a camera, a proximity sensor, an optical sensor, an infrared sensor, an ultrasound sensor, a laser distance sensor, a hall sensor, or any other suitable sensor for determining the position of the manipulator and/or the suction gripper.

Optionally, the controller determines suction gripper and/or manipulator instructions in dependence of the suction gripper status. Once the controller has determined what the suction gripper or the manipulator is currently doing, the controller can send instructions to control the suction gripper in response.

Optionally, the controller determines that the suction gripper status is one or more of the following: the suction gripper is blocked, an object has slipped off the suction gripper, the suction gripper has failed to grip an object, the suction gripper is gripping an object, based on the pressure information and/or the position of manipulator and/or the suction gripper. The controller can determine different situations of the suction gripper. The controller may determine other statuses of the suction gripper not listed above.

Optionally, the waste sorting robot comprises a valve coupled to the controller and for selectively controlling the direction of airflow through the suction gripper. This means that the controller can cause the suction gripper to suck or blow through the suction gripper. This means that the controller can selectively cause an object to be urged towards or away from the suction gripper.

Optionally, the controller is configured to select an operative valve mode of the valve in dependence on the pressure signal and/or the position of the manipulator. In this way, the controller can determine whether the suction gripper is normally operating or malfunctioning and take remedial action. Furthermore, the feedback from the pressure sensor is used by the controller to determine whether a pick has failed during a pick operation. This means that the controller can adapt and control the suction gripper and/or the manipulator more efficiently.

Optionally, the controller selects a blow valve mode to blow air through the suction gripper to unblock the suction gripper and/or to blow an object from suction gripper. This means that the controller can selectively use the direction of the airflow in the suction gripper to unblock the suction gripper.

Optionally, the suction gripper is slidably mounted on the manipulator. This means that the suction gripper can absorb some of the shock when the suction gripper engages an object. This increases the chances of a successful grip on an object and protects the manipulator from damage.

Optionally, the controller reverses the direction of the manipulator away from the working area in dependence on the pressure signal.

Optionally, the pressure signal comprises at least one of: a rate of change of the pressure in the suction cup, a magnitude of the pressure in the suction cup, a negative pressure value, and/or a positive pressure value.

Optionally, the at least one pressure sensor is one or more of the following: piezoelectric pressure sensor, electrostatic pressure sensor, piezoresistive pressure sensor, resonant pressure sensor, a pressure transducer, a Wheatstone bridge pressure transducer, a differential pressure transducer, a diaphragm pressure sensor, an inductive pressure sensor, a reluctive pressure sensor, or an optical pressure sensor.

Optionally, the controller varies the suction force generated by the suction gripper in dependence of the pressure signal. In this way, the controller can react to changes in the pressure signal to increase the chances of a successful grip. The controller can determine an increasing pressure in the suction cup and increase the suction force to ensure that an object does not slip off the suction gripper during a pick.

In another aspect of the invention, there is provided method of controlling a waste sorting robot comprising: sending control instructions from a controller to a manipulator comprising a suction gripper for interacting with one or more waste objects to be sorted within a working area, and wherein the manipulator is moveable within the working area; determining a pressure signal in dependence on a fluid pressure in the suction gripper with at least one pressure sensor in fluid communication with the suction gripper and connected to the controller; determining a position signal in dependence of the position of the manipulator and/or the suction gripper; and determining manipulator instructions in dependence on the pressure signal relating to the pressure of the suction gripper and the position signal relating to the position of the manipulator and/or the suction gripper.

In another aspect of the invention, there is provided a waste sorting robot comprising: a manipulator comprising a suction gripper for interacting with one or more waste objects to be sorted within a working area, wherein the manipulator is moveable within the working area and wherein the suction gripper is moveable relative to the manipulator between a first position and a second position; a controller configured to send control instructions to the manipulator; and at least one sensor configured to detect the suction gripper moving between the first and second positions; wherein the controller is configured to actuate the suction gripper in dependence on a signal detecting the suction gripper has moved between the first and second positions.

This means that the air source is only used when the suction gripper engages an object. Engagement of the suction gripper and the object is determined by physical movement of the suction gripper with respect to the manipulator. Accordingly, the mechanical feedback is detected by the sensor and the controller controls the operation of the suction gripper accordingly.

BRIEF DESCRIPTION OF THE DRAWINGS

Various other aspects and further embodiments are also described in the following detailed description and in the attached claims with reference to the accompanying drawings, in which:

DETAILED DESCRIPTION

Figure 1:
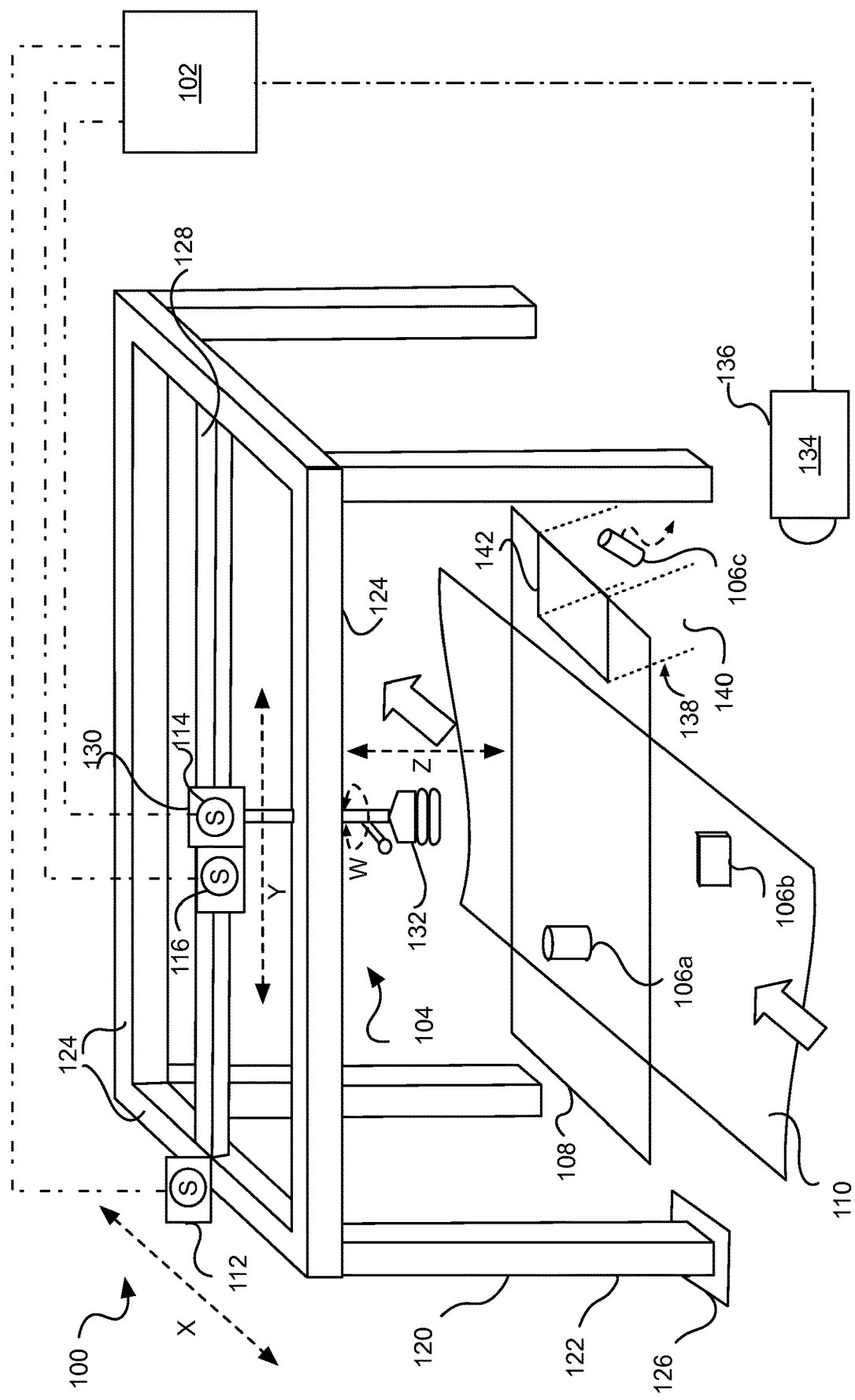
FIG. 1 shows a perspective schematic view of the waste sorting gantry robot.

FIG. 1 shows a schematic perspective view of a waste sorting robot 100. In some embodiments, the waste sorting robot 100 can be a waste sorting gantry robot 100. In other embodiments other types of waste sorting robots can be used. For the purposes of brevity, the embodiments will be described in reference to waste sorting gantry robots, but can also be other types of robot such as robot arms or delta robots.

In some embodiments, the waste sorting robot 100 is a Selective Compliance Assembly Robot Arm (SCARA). The waste sorting SCARA 100 may move in the X, Y, and Z planes like the waste sorting gantry robot, but incorporate movement in a theta axis at the end of the Z plane to rotate the end-of-arm tooling e.g. the gripper assembly 132. In some embodiments, the waste sorting robot 100 is a four axis SCARA robot 100 that consists of an inner link arm (not shown) that rotates about the Z-axis. The inner link arm is connected to an outer link arm (not shown) that rotates about a Z elbow joint (not shown). The Z elbow joint is connected to a wrist axis (not shown) that moves up and down and also rotates about Z. In some embodiments the waste sorting SCARA 100 comprises an alternative configuration which has the linear Z motion as the second axis.

For the purposes of brevity, the embodiments will be described in reference to waste sorting gantry robots 100, but any of the other aforementioned robot types can be used instead or in addition to the water sorting gantry robot 100.

Figure 2:
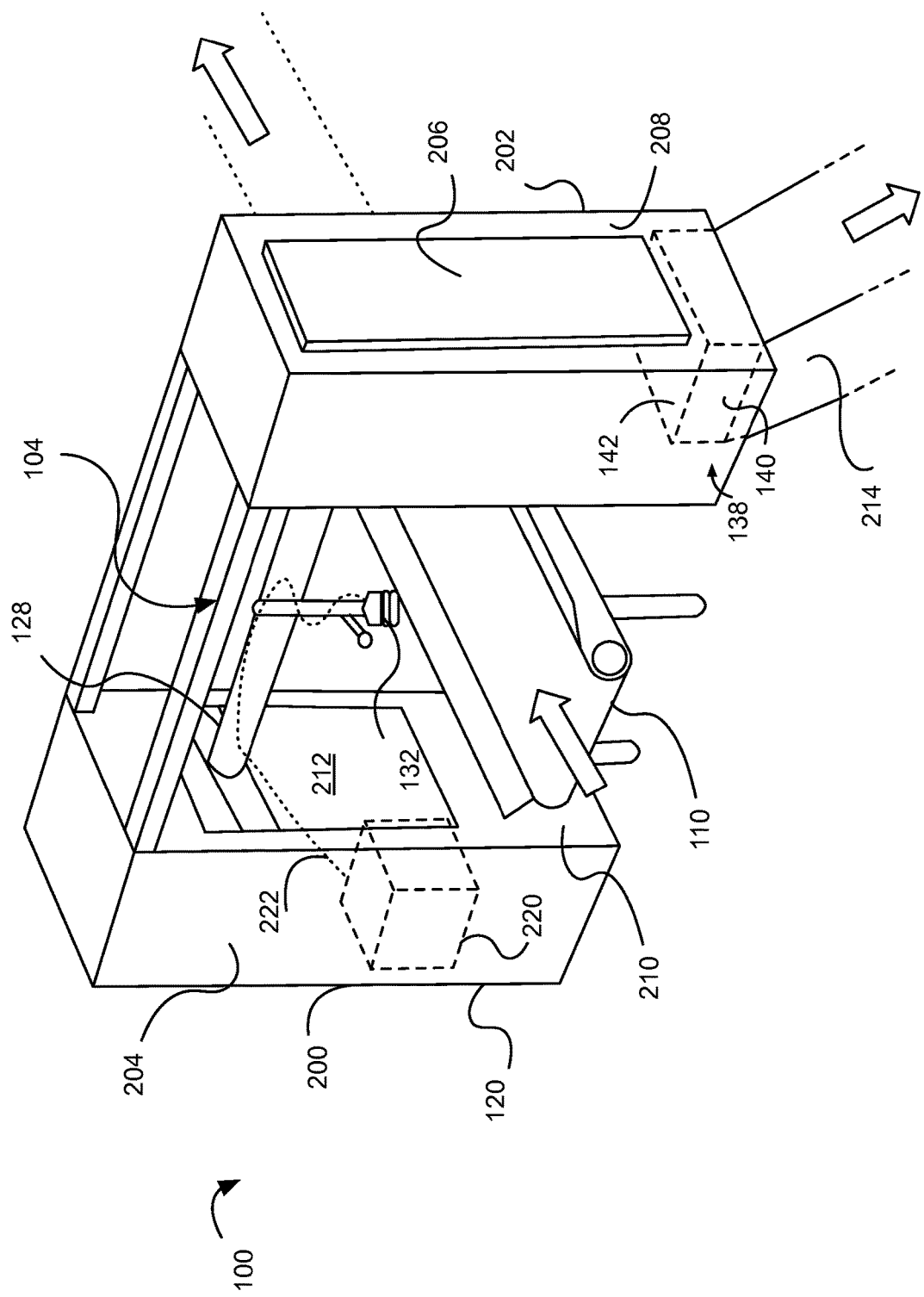
FIG. 2 shows another perspective schematic view of the waste sorting gantry robot.

The waste sorting gantry robot comprises a controller 102 for sending control and movement instructions to a manipulator 104 for interacting with the physical objects 106a, 106b, 106c. The combination of a controller sending control instructions to a manipulator can also be referred to as a "robot". The controller 102 is located remote from the manipulator 104 and is housed in a cabinet (as shown in FIG. 2). In other embodiments, the controller 102 can be integral with the manipulator and/or a gantry frame 120.

The manipulator 104 physically engages and moves the objects 106a, 106b, 106c that enters the working area 108. The working area 108 of a manipulator 104 is an area within which the manipulator 104 is able to reach and interact with the object 106a 106b, 106c. The working area 108 as shown in FIG. 1 is projected onto a conveyor belt 110 for the purposes of clarity. The manipulator 104 is configured to move at variable heights above the working area 108. In this way, the manipulator 104 is configured to move within a working volume defined by the height above the working area 108 where the robot can manipulate an object. The manipulator 104 comprises one or more components for effecting relative movement with respect to the objects 106a, 106b, 106c. The manipulator 104 will be described in further detail below.

The physical objects 106a, 106b, 106c are moved into the working area 108 by the conveyor belt 110. The path of travel of the conveyor belt 110 intersects with at least a portion of the working area 108. In some embodiments, manipulator 104 can move over the entire working area 108. In other embodiments, the manipulator 104 can move through a portion of the working area 108 and a plurality of waste sorting robots 100 operate within the working area 108. For example, two waste sorting robots 100 can cover the entire conveyor belt 110. This means that every object 106a, 106b, 106c that is moving on the conveyor belt 110 will pass through the working area 108. The conveyor belt 110 can be a continuous belt, or a conveyor belt formed from overlapping portions. The conveyor belt 110 can be a single belt or alternatively a plurality of adjacent moving belts.

In other embodiments, the physical objects 106a, 106b, 106c can be conveyed into the working area 108 via other conveying means. The conveyor can be any suitable means for moving the objects 106a, 106b, 106c into the working area 108. For example, the objects 106a, 106b, 106c are fed under gravity via slide (not shown) to the working area 108. In other embodiments, the objects can be entrained in a fluid flow, such as air or water, which passes through the working area 108.

The direction of the conveyor belt 110 is shown in FIG. 1 by two arrows. The objects 106a, and 106b are representative of different types of objects to be sorted having not yet been physically engaged by the manipulator 104. In contrast, the object 106c is an object that has been sorted into a particular type of object. In some embodiments, the manipulator 104 interacts with only some of the objects 106c. For example, the waste sorting gantry robot 100 is only removing a particular type of objects. In other scenarios, the manipulator 104 will interact and sort every object 106a, 106b, 106c which is on the conveyor belt 110.

In some embodiments, the objects to be sorted are waste products. The waste products can be any type of industrial, commercial, domestic waste or any other waste which requires sorting and processing. Unsorted waste material comprises a plurality of fractions of different types of waste. Industrial waste can comprise fractions, for example, of metal, wood, plastic, hardcore and one or more other types of waste. In other embodiments, the waste can comprise any number of different fractions of waste formed from any type or parameter of waste. The fractions can be further subdivided into more refined categories. For example, metal can be separated into steel, iron, aluminium etc. Domestic waste also comprises different fractions of waste such as plastic, paper, cardboard, metal, glass and/or organic waste.

A fraction is a category of waste that the waste can be sorted into by the waste sorting gantry robot 100. A fraction can be a standard or homogenous composition of material, such as aluminium, but alternatively a fraction can be category of waste defined by a customer or user.

In some embodiments, the waste can be sorted according to any parameter. A non-limiting list of parameters for dividing unsorted waste into fractions is as follows: material, previous purpose, size, weight, colour, opacity, economic value, purity, combustibility, whether the objects are ferrous or any other variable associated with waste objects. In a further embodiment, a fraction can comprise one or more other fractions. For example, one fraction can comprise a paper fraction, a cardboard fraction, and a wood fraction to be combinable to be a combustible fraction. In other embodiments, a fraction can be defined based on the previous purpose of the waste object, for example plastic tubes used for silicone sealant. It may be desirable to separate out some waste objects because they are contaminated and cannot be recycled.

The objects are fed from a hopper or other stored source of objects onto the conveyor belt 110. Alternatively, the waste objects are fed from another conveyor belt (not shown) and there is no source of stored waste objects. In this case, the additional conveyor belt can be fed manually from e.g. an excavator. Optionally, the objects 106a, 106b, 106c can be pre-processed before being placed on the conveyor belt. For example, the objects can be washed, screened, crushed, ripped, shaken, vibrated to prepare the material before sorting. Alternatively, the waste objects 106a, 106b, 106c can be sorted with another robot or mechanical device. The objects 106a, 106b, 106c can be optionally pre-sorted before being placed on the conveyor belt 110. For example, ferrous material can be removed from the unsorted waste by passing a magnet in proximity to the conveyor belt 110. Large objects can be broken down into pieces of material which are of a suitable size and weight to be gripped by the manipulator 104.

The manipulator 104 is configured to move within the working volume. The manipulator 104 comprises one or more mechanisms for moving the manipulator 104 in one or more axes. The mechanisms can be servos, pneumatic actuators or any other suitable means for moving the manipulator 104. The manipulator 104 comprises one or more servos for moving the manipulator 104 in one or more axes. In some embodiments, the manipulator 104 is moveable along a plurality of axes. In some embodiments, the manipulator 104 is moveable along three axes which are substantially at right angles to each other. In this way, the manipulator 104 is movable in an X-axis which is parallel with the longitudinal axis of the conveyor belt 110 ("beltwise"). Additionally, the manipulator 104 is movable across the conveyor belt 110 in a Y-axis which is perpendicular to the longitudinal axis of the conveyor belt 110 ("widthwise"). The manipulator 104 is movable in a Z-axis which is in a direction normal to the working area 108 and the conveyor belt 110 ("heightwise"). Optionally, the manipulator 104 can rotate about one or more axes. In some embodiments a gripper assembly 132 coupled to the manipulator 104 can rotate about a W-axis. The gripper assembly 132 is discussed in further detail below.

The directions of movement of the manipulator 104 within the working space along the X-axis, Y-axis and the Z-axis are shown by the two headed arrows with dotted lines. The manipulator 104 is moved with respect to the conveyor belt 110 by an X-axis servo 112, a Y-axis servo 114 and a Z-axis servo 116 respectively along the X-axis, the Y-axis and the Z-axis. The servos 112, 114, 116 are connected to the controller 102 and the controller 102 is configured to issue instructions for actuating one or more servos 112, 114, 116 to move the manipulator 104 within the working space 108. The connections between the servos 112, 114, 116 and the controller 102 are represented by dotted lines. Each connection between the servo 112, 114, 116 and the controller 102 can comprises one or more data and/or power connections.

Since the directions of movement of the manipulator 104 are substantially perpendicular to each other, movement of the manipulator in one of the axes is independent of the other axes. This means that the manipulator 104 movement can be defined in a Cartesian coordinate frame of reference which makes processing movement instructions by the controller 102 simpler.

As mentioned previously, the manipulator 104 is mounted on a frame 120. In some embodiments, the frame 120 can be a gantry frame 120. In other embodiments, the frame 120 can be other structures suitable for supporting the manipulator 104 above the working area 108. For example, the frame 120 can be a structure for suspending the manipulator 104 above the working area with rods and/or cables. Hereinafter, the frame 120 will be referred to a gantry frame 120 but can be applicable to other frames for supporting a manipulator 104.

The gantry frame 120 comprises vertical struts 122 which engage with the floor or another substantially horizontal surface. In some embodiments, the vertical struts 122 can be tilted upright struts. In this way, the tilted upright struts are angled to the vertical. The tilted upright struts may be required to mount the gantry frame 120 to the floor in a non-standard installation. FIG. 1 shows the gantry frame 120 comprising four vertical struts 122 coupled together by horizontal beams 124. In other embodiments, the horizontal beams 124 can be tilted lateral beams 124. This may be required if the waste sorting gantry robot 100 is being installed in a small or unusual space. In other embodiments, there can be any suitable number of vertical struts 122. The beams 124 and struts 122 are fixed together with welds, bolts or other suitable fasteners. Whilst the horizontal beams 124 are shown in FIG. 1 to be located above the conveyor belt 110, one or more horizontal beams 124 can be positioned at different heights. For example, one or more horizontal beams 124 can be positioned underneath the conveyor belt. This can lower the centre of mass of the gantry frame 120 and make the entire waste sorting gantry robot 100 more stable if the vertical struts 122 are not secured to the floor.

The beams 124 and the struts 122 are load bearing and support the weight of the manipulator 104 and an object 106a, 106b, 106c that the manipulator 104 grasps. In some embodiments, the beams 124 and struts 122 are made from steel but other stiff, lightweight materials such as aluminium can be used. The vertical struts 122 can each comprise feet 126 comprising a plate through which bolts (not shown) can be threaded for securing the struts 122 to the floor. For the purposes of clarity, only one foot 126 is shown in FIG. 1, but each strut 122 can comprise a foot 126. In other embodiments, there are no feet 126 or fasteners for securing the gantry frame 120 to the floor. In this case, the gantry frame rests on the floor and the frictional forces between the gantry frame and the floor are sufficient to prevent the waste sorting gantry robot from moving with respect to the floor.

The manipulator 104 comprises at least one movable horizontal beam 128 which is movably mounted on the gantry frame 120. The moveable beam 128 can be mounted in a beam carriage (not shown). The moveable horizontal beam 128 is movably mounted on one or more of the other fixed horizontal beams 124 of the gantry frame 120. The moveable horizontal beam 128 is movable in the X-axis such that the manipulator 104 moves in the X-axis when the movable horizontal beam moves in the X-axis. The moveable horizontal beam 128 is mounted to the fixed horizontal beams 124 via an X-axis servo mechanism 112. In some embodiments, the servo 112 is coupled to the moveable horizontal beam 128 via a belt drive. In other embodiments, the servo is coupled to the moveable horizontal beam via a rack and pinion mechanism. In some embodiments, other mechanisms can be used to actuate movement of the moveable horizontal beam along the X-axis. For example, a hydraulic or pneumatic system can be used for moving the movable horizontal beam 128.

The X-axis servo 112 can be mounted on the moveable beam 128 or on the fixed horizontal beams 124. It is preferable for the X-axis servo to be mounted on the fixed horizontal beams 124 such that the X-axis servo does not have to exert force moving its own weight.

A manipulator carriage 130 is movably mounted on the moveable horizontal beam 128. The manipulator carriage 130 is moveable along the longitudinal axis of the movable horizontal beam 128. In this way, the manipulator carriage 130 is movable in the Y-axis relative to the moveable beam 128. In some embodiments, the manipulator carriage 130 comprises a Y-axis servo mechanism 114 for moving the manipulator carriage 130 along the Y-axis. In other embodiments, the Y-axis servo 114 is not mounted in the manipulator carriage 130 and manipulator carriage 130 moves with respect to the Y-axis servo. In some embodiments, the servo 114 is coupled to the moveable horizontal beam 128 via a belt drive. In other embodiments, the servo 114 is coupled to the moveable horizontal beam 128 via a rack and pinion mechanism. In some embodiments, other mechanisms can be used to actuate movement of the moveable horizontal beam along the Y-axis. For example, a hydraulic or pneumatic system can be used for moving the manipulator carriage 130.

When the manipulator carriage 130 moves along the Y-axis, a gripper assembly 132 also moves in the Y-axis. The gripper assembly 132 is movably mounted to the manipulator carriage 130. The gripper assembly 132 is movable in the Z-axis in order to move the manipulator 104 heightwise in the Z-axis direction.

In some embodiments, the gripper assembly 132 comprises a Z-axis servo mechanism 116 for moving the gripper assembly 132 along the Z-axis. In other embodiments, the Z-axis servo 116 is not mounted in the gripper assembly 132 but is mounted in the manipulator carriage 130. In this way, the gripper assembly 132 moves with respect to the Z-axis servo 116. In some embodiments, the servo 116 is coupled to the gripper assembly 132 via a belt drive. In other embodiments, the servo 116 is coupled to the gripper assembly 132 via a rack and pinion mechanism. In some embodiments, other mechanisms can be used to actuate movement of the moveable horizontal beam along the Z-axis. For example, a hydraulic or pneumatic system can be used for moving the gripper assembly 132.

As mentioned, the manipulator 104 as shown in FIG. 1 comprises a gripper assembly 132. The gripper assembly 132 can be a suction gripper (as shown in FIGS. 2 to 6) for gripping the objects using negative pressure with respect to atmospheric pressure. Hereinafter the gripper assembly 132 will be referred to as a suction gripper 132. The suction gripper 132 can have a suction cup 400 (see FIG. 4) which is substantially symmetric about the Z-axis. This means that the suction gripper 132 does not need to be rotated about the Z-axis to achieve an optimal orientation with respect to the objects 106a, 106b, 106c. This means that the gripper assembly rotation servo is not required with a suction gripper 132. In the case with an asymmetrical suction gripper 132, the gripper assembly 132 comprises a rotation servo to rotate the gripper assembly 132 about the W-axis as previously discussed above. Rotation of the suction gripper 132 about the W-axis is shown in FIG. 1, but the servo for causing the rotation is not shown. The suction gripper 132 can have an elongate suction cup 400. Additionally or alternatively, the suction gripper 132 can comprises a plurality of suction grippers. For example, the suction gripper 132 can comprise an asymmetrical suction gripper 132 comprising two suction tubes 414 each with a suction cup 400.

In other embodiments, the suction gripper 132 of the manipulator 104 additionally comprise any suitable means for physically engaging and moving the objects 106a, 106b, 106c. Indeed, the manipulator 104 can additionally be one or more tools for grasping, securing, gripping, cutting or skewering objects. In further embodiments the manipulator 104 can additionally be a tool configured for interacting with and moving an object at distance such as an electromagnet or a nozzle for blowing compressed air.

As mentioned, the controller 102 is configured to send instructions to the servos 112, 114, 116 of the manipulator 104 to control and interact with objects 106a, 106b, 106c on the conveyor belt 110. The controller 102 is connected to at least one sensor 134 for detecting the objects 106a, 106b, 106c on the conveyor belt 110. The at least one sensor 134 is positioned in front of the manipulator 104 so that detected measurements of the objects 106a, 106b, 106c are sent to the controller 104 before the objects 106a, 106b, 106c enter the working area 108. In some embodiments, the at least one sensor 134 can be one or more of a RGB camera, an infrared camera, a metal detector, a hall sensor, a temperature sensor, visual and/or infrared spectroscopic detector, 3D imaging sensor, terahertz imaging system, radioactivity sensor and/or a laser. The at least one sensor 134 can be any sensor suitable for determining a parameter of the object 106a, 106b, 106c.

FIG. 1 shows that the at least one sensor 134 is positioned in one position. The at least one sensor 134 is mounted in a sensor housing 136 to protect the sensor 134. In other embodiments, a plurality of sensors are positions along and around the conveyor belt 110 to receive parameter data of the objects 106a, 106b, 106c.

The controller 102 receives information from the at least one sensor 134 corresponding to one or more objects 106a, 106b, 106c on the conveyor belt 110. The controller 102 determines instructions for moving the manipulator 104 based on the received information according to one or more criteria. Various information processing techniques can be adopted by the controller 102 for controlling the manipulator 104. Such information processing techniques are described in WO2012/089928, WO2012/052615, WO2011/161304, WO2008/102052 which are incorporated herein by reference.

Once the manipulator 104 has received instructions from the controller 102, the manipulator 104 executes the commands and moves the suction gripper 132 to pick an object 106c from the conveyor belt 110. The process of selecting and manipulating an object on the conveyor belt 110 is known as a "pick".

Once a pick has been completed, the manipulator 104 drops or throws the object 106c into a chute 138. An object 106c dropped into the chute 138 is considered to be a successful pick. A successful pick is one where an object 106c was selected and moved to the chute 138 associated with the same fraction of waste as the object 106c.

The chute 138 comprises a chute opening 142 in the working area 108 for dropping picked objects 106c. The chute opening 142 of the chute 138 is adjacent to the conveyor belt 110 so that the manipulator 104 does not have to travel far when conveying a picked object 106c from the conveyor belt 110 to the chute opening 142. By positioning the chute opening 142 of the chute adjacent to the conveyor belt 110, the manipulator 104 can throw, drop, pull and/or push the object 106c into the chute 138.

The chute 138 comprises walls 140 defining a conduit for guiding picked objects 106c into a fraction receptacle (not shown) for receiving a sorted fraction of waste. In some embodiments, a fraction receptacle is not required and the sorted fractions of waste are piled up beneath the chute 138. FIG. 1 only shows one chute 138 associated with the manipulator 104. In other embodiments, there can be a plurality of chutes 138 and associated openings 142 located around the conveyor belt 110. Each opening 142 of the different chutes 138 is located within the working area 108 of the manipulator 104. The walls 140 of the conduit can be any shape, size or orientation to guide picked objects 106c to the fraction receptacle. In some embodiments, the successfully picked objects 106c move under the force of gravity from the chute opening 142 of the chute 138 to the fraction receptacle. In other embodiments, the chute 138 may guide the successfully picked objects 106c to another conveyor belt (not shown) or other means for moving the successfully picked objects 106c to the fraction receptacle.

Turning to FIG. 2, another embodiment will be discussed. FIG. 2 shows a schematic perspective view of a waste sorting gantry robot 100. The conveyor belt 110 is positioned between the gantry frame 120. For the purposes of clarity, no objects 106a, 106b, 106c have been shown on the conveyor belt 110.

The gantry frame 120 as shown in FIG. 2 comprises a different configuration and construction from that shown in FIG. 1. In particular, the gantry frame 120 comprises two cabinets 200, 202. The cabinet 200, 202 comprise internal struts and horizontal beams similar to those discussed in reference to the embodiments shown in FIG. 1. However the cabinet structures 200, 202 comprise sheet material 204 to cover the struts and the horizontal beams providing the walls, top and bottoms of the cabinets 200, 202.

The cabinets 200, 202 provide shielding for the delicate parts to the manipulator 104 such as the servos (not shown for clarity). This helps protect the manipulator from be damaged from stray waste objects. Furthermore the cabinet structures 200, 202, provide a barrier between the moving parts and the human operator. This means that the human operator cannot accidentally stray into the working area 108 of the waste sorting gantry robot. The gantry frame 120 comprises at least one enclosure 200, 202. The enclosure 200, 202 surrounds at least a part of the gantry frame 120. In some embodiments, there can be a plurality of enclosures 200, 202, each surrounding one or more parts of the waste sorting gantry robot 100. The enclosure 200, 202 can be a solid sheet material or can be perforated so that one or more internal parts of the waste sorting gantry robot 100 are visible. The enclosure 202, 204 for example, surrounds the chute 138 on three sides. The enclosure 200, 202 also surrounds at least a portion of the manipulator 104. In other embodiments, the enclosure 200, 202 can completely surround and enclose the waste sorting gantry robot 100. In this case, the enclosure 200, 202 comprises openings for the waste sorting objects 106a, 106b, 106c to be conveyed into the working area 108.

FIG. 2 shows a suction gripper 132 which is in fluid communication with a pneumatic system 220. The pneumatic system 220 comprises at least one hose 222 for connecting the suction gripper 132 to the pneumatic system 220. In some embodiments, the hose is an air hose 222 for providing a source of air to the suction gripper 132. In some embodiments, there is a single, unitary air hose connected to the suction gripper 132. By providing only one air hose 222 to the suction gripper 132, installation and maintenance of the waste sorting robot 100 is simplified. Furthermore, by only having one air hose and not requiring a long vacuum hose for the suction gripper 132, there are less energy losses due to friction in the pneumatic system 220. Operation of the suction gripper 132 using the single air hose 222 will be discussed in further detail below.

The air hose 222 is flexible and threaded along the movable horizontal beam 128 in to the cabinet 200. In some embodiments, (not shown in FIG. 2) the air hose 222 can be inserted within the hollow moveable beam 128. The hose 222 is sufficiently flexible to move and flex so as to change shape as the manipulator 104 moves without impeding the movement of the manipulator 104.

At least a portion of the pneumatic system 220 is housed in the cabinet 200 or the gantry frame 120. The pneumatic system 220 can comprise an air compressor for generating a source of compressed air. Optionally, the pneumatic system 220 can also comprise an air storage tank (not shown) for compressed air. Furthermore, the pneumatic system 220 can also comprise one or more valves 224 for selectively providing air to the suction gripper 132. In some embodiments, the air compressor generates an air source having a pressure of 8 Bar. In other embodiments, the air source has a pressure of 5 Bar to 10 Bar. In other embodiments, the air source can have any suitable pressure above atmospheric pressure.

The pneumatic system 220 is schematically shown as being located within the cabinet 200. However, in other embodiments the pneumatic system 220 can be partially or wholly located remote from the waste sorting robot 100. For example, there may be a plurality of waste sorting robots 100 on a sorting line (not shown) each of which require a source of air. In this way, a single air compressor can be connected to a plurality of waste sorting robots 100 via a plurality of air hoses 222. Accordingly, the pneumatic system 220 may be located between waste sorting robots 100.

Figure 3:
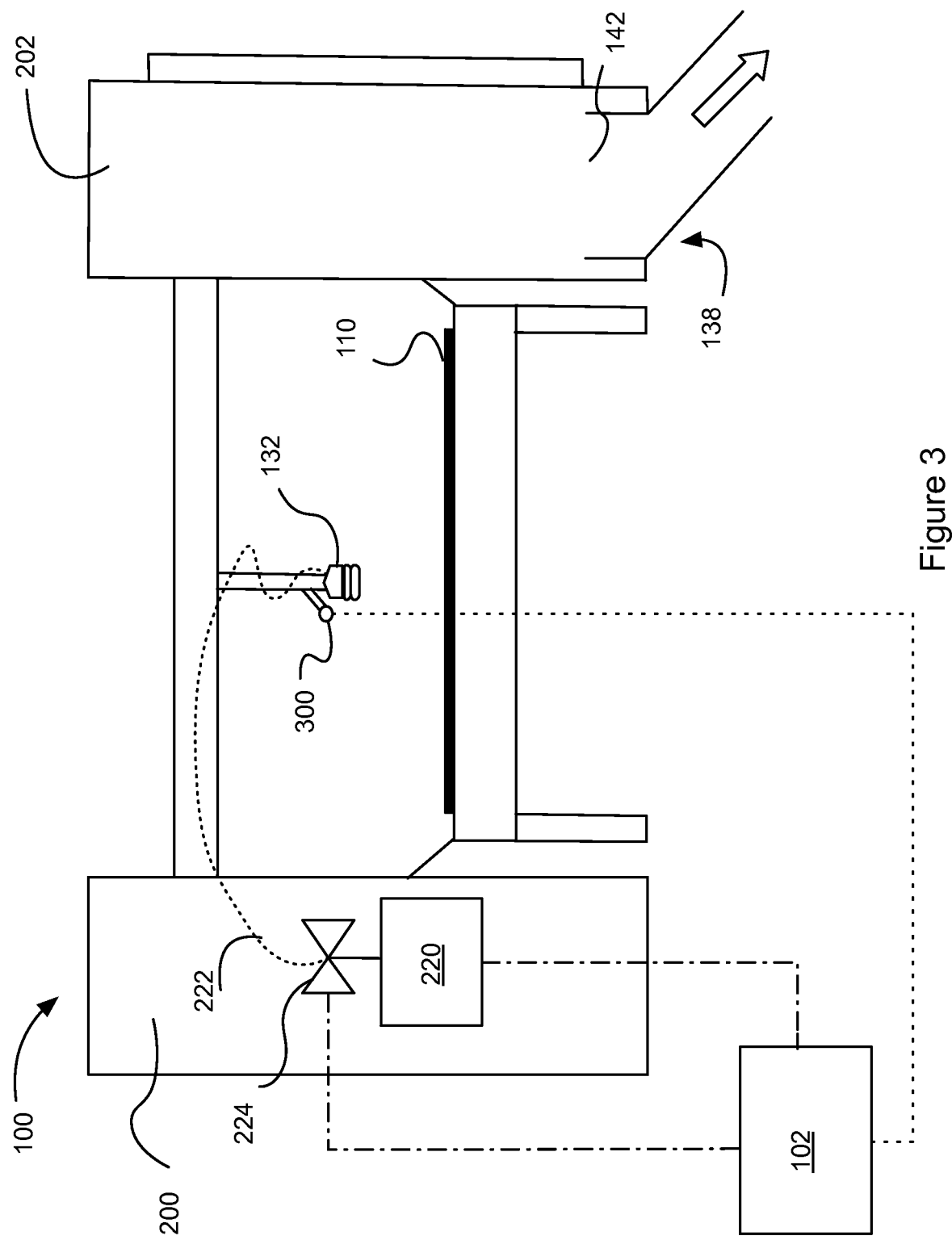
FIG. 3 shows a schematic cross-sectional view of the waste sorting gantry robot.

FIG. 3 shows a schematic cross section of the waste sorting gantry robot 100. Operation of the pneumatic system 220 is controlled by the controller 102. This means that the controller 102 can selectively operate e.g. the air compressor or the valve 224 of the pneumatic system 220 to deliver a supply of air to the suction gripper 132.

Figure 4:
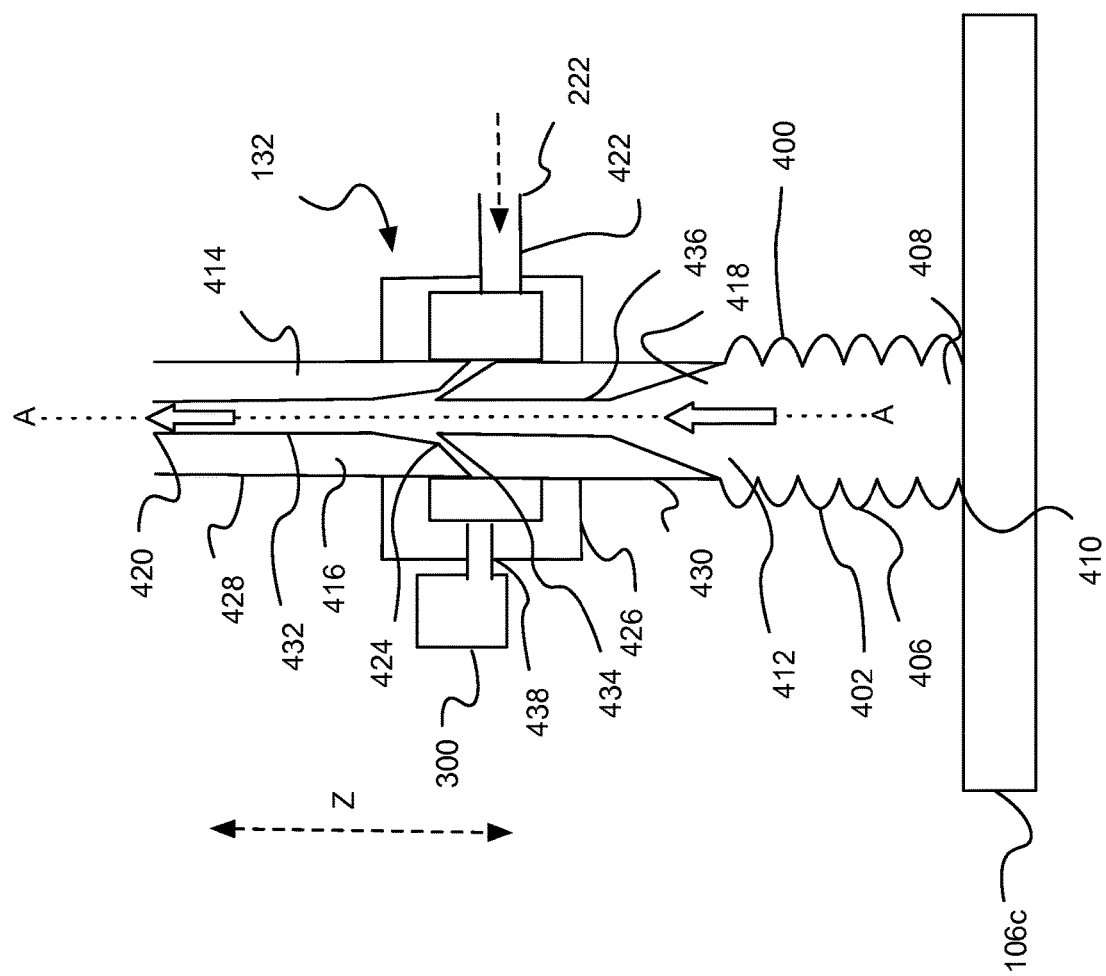
FIG. 4 shows a schematic cross-sectional view of a gripper assembly.

The pneumatic system 220 comprises at least one pressure sensor 300 configured to measure the pressure in the suction gripper 132. The pressure sensor 300 is in fluid communication with the suction cup 400 (as shown in FIG. 4). In this way, the pressure at the pressure sensor 300 is the same or similar to the pressure in the suction cup 400. The pressure sensor 300 is mounted to the suction gripper 132 so that the pressure sensor 300 is proximal to the suction cup 400. The pressure sensor 300 is connected to the controller 102. The connection between the pressure sensor 300 and the controller 102 is represented by the dotted line therebetween. The pressure sensor 300 can be coupled to the controller 102 with a wired or a wireless connection. The wireless connection can transmit the pressure signal over radio frequency from the pressure sensor 300 to the controller 102. The pressure sensor 300 determines the current operating fluid pressure in the suction gripper 132 at the suction cup 400 and sends a measurement signal to the controller 102. The signal is an output voltage which varies in dependence of the fluid pressure in the suction cup 400. In other embodiments, the signal is a current output which varies in dependence of the fluid pressure in the suction cup 400.

In some embodiments, optionally the at least one pressure sensor 300 is a plurality of pressure sensors 300 for measuring the pressure at different points in suction gripper 132. A plurality of pressure sensors 300 can indicate the pressure differential across different parts of the suction gripper 132. Identifying the location of a pressure differential is advantageous because it can indicate the location of a blockage in the suction gripper 132.

In some embodiments the pressure sensor 300 is mounted on an integrated circuit (not shown) for pre-processing the measurement signal. This means that the integrated circuit coupled to the pressure sensor sends a data packet to the controller 102 comprising information relating to the pressure at the suction cup 400.

In some embodiments, the pressure sensor 300 can be mounted anywhere on the suction gripper 132. As long as the pressure sensor 300 is in fluid communication with the suction cup 400 of the suction gripper 132, the pressure sensor 300 can measure the pressure at the suction cup 44.

The pressure sensor 300 can be a piezoelectric pressure sensor, electrostatic pressure sensor, piezoresistive pressure sensor, resonant pressure sensor, a pressure transducer, a Wheatstone bridge pressure transducer, a differential pressure transducer, a diaphragm pressure sensor, an inductive pressure sensor, a reluctive pressure sensor, a board mounted pressure sensor, or an optical pressure sensor. In other embodiments, the pressure sensor 300 can be any suitable means for measuring the pressure in the suction gripper 132.

In some embodiments, the pressure sensor 300 comprises a plastic housing. A plastic housing may be preferable because this reduces the weight of the pressure sensor 300 and increases the maximum payload of the suction gripper 132. In some embodiments, the pressure sensor 300 is a board mounted pressure sensor and is mounted on the inside of the suction pipe 414.

An embodiment of the suction gripper 132 will now be discussed in reference to FIG. 4. FIG. 4 shows a cross sectional side view of the suction gripper 132 in operation. The suction gripper 132 comprises a suction cup 400 having a side wall 402 and a suction mouth 408. In some embodiments, the suction cup 400 has a top wall (not shown) and the distance between opposite side walls 402 narrows towards the top of the suction cup 400. The suction mouth 408 of the suction cup 400 is arranged to engage with an object to be sorted 106c. The suction cup 400 comprises a hollow construction and a generally circular cross-section (across the Z-axis). In other embodiments, the suction cup 400 is elongate across the Z-axis and has a rectangular or oval cross-sectional shape.

As mentioned in some embodiments, the suction cup 400 can be elongate and/or asymmetrical about one or more axes. In this case, the suction gripper 132 may comprise a rotation servo (not shown) to rotate the suction gripper 132 about the W-axis as previously discussed in reference to FIG. 1.

In some embodiments, the side wall 402 of the suction cup 400 comprises a ribbed or concertinaed wall portion 406. The ribbed wall portion 406 creates a resiliently flexible portion in the suction cup 400 such that the suction cup 400 preferentially compresses in the Z-axis. In this way, when the suction cup 400 descends in the direction of the Z-axis and engages the object 106c, the ribbed wall portion 406 help absorbs force of the impact which protects the manipulator 104. Furthermore, the concertina shape of the side wall 402 allows the suction cup 400 to conform to the shape of the object to be picked 106a, 106b.

The suction cup 400 is made from a resiliently deformable material such as silicon, rubber or other similar material. This means that the suction cup 400 can deform when the suction cup abuts an irregular shape. Accordingly, the suction cup 400 can make a better seal between the lip 410 of the side wall 402 and the object 106c to be picked.

The suction cup 400 comprises an air hole 412 in fluid communication with a first air inlet 418 of a suction tube 414 for evacuating air from the space within the suction cup 400. The air hole 412 comprises a diameter which is the same size as or similar to the diameter of the suction tube 414. This means that the air can flow easier between the suction cup 400 to the suction tube 414. In this way, the diameter of the sidewall 402 is the same as the diameter of the suction tube 414. In other embodiments, the diameters of the air hole 412 and the suction tube 414 may be different and the bore of the suction tube narrows or widens. Optionally, there is a seal between the air hole 412 and the suction tube 414 so that no air flow is enters between the join of the suction cup 400 at the air hole 412 and the suction tube 414.

The suction tube 414 comprises an elongate side wall 416. The suction tube 414 comprises the first air inlet 418 at one end and an air outlet 420 at another end. The elongate side wall 416 comprises a longitudinal axis A-A which is substantially parallel with the Z-axis. Both the first air inlet 418 and the air outlet 420 are aligned with the longitudinal axis A-A of the suction tube 414. This means that the suction air flow path from the first air inlet 418 to the air outlet 420 is a straight line. This means that there are no curves or blockages which impede the air flow in the suction tube 414.

The air hole 412 is sealed to the first air inlet 418. The suction cup 400 can be glued to the suction tube 414 between the air hole 412 and the first air inlet 418. In other embodiments, the suction cup 400 and the suction tube 412 are integral and there is no join between the air hole 412 and the first air inlet 418.

The suction tube 414 is cylindrical and comprises a circular cross-sectional shape (across the Z-axis). In other embodiments, the suction tube is not a cylinder and comprises an oval, square, rectangular, or irregular cross-sectional shape. The suction tube 414 as shown in FIG. 4 comprises a uniform diameter, but the suction tube 414 can vary in width along the longitudinal length of the suction tube 414. In some embodiments, the suction tube 414 is between 5 cm to 20 cm long.

The suction air flow through the suction gripper 132 enters from the mouth 408 suction cup 400, through the air hole 412, along the suction tube 414, and exits the suction tube 414 at the air outlet 420. Arrows represent air flow into, through and out of the suction gripper 132 as shown in FIG. 4.

The negative pressure generated for the suction air flow will now be described. A negative pressure is a pressure relative to and less than atmospheric pressure. The suction air flow for the suction gripper 132 is generated near the suction cup 400 of the suction gripper 132, which avoids the need for a vacuum hose.

The suction tube 414 comprises a second air inlet 422 which is in fluid communication with the air hose 222. Accordingly, the second air inlet 422 introduces an air source of compressed air into the suction tube 414 between the first air inlet 418 and the air outlet 420. In this way the air source of compressed air exits the second air inlet 422 and the source of compressed air is introduced into the suction air flow path. The second air inlet 422 is in the side wall 416 of the suction tube 414 and so the air source is initially introduced perpendicular to the longitudinal axis A-A of the suction tube 414. However, the second air inlet 422 also directs the air flow into the suction tube 414 towards the air outlet 420. In some embodiments, the second air inlet 422 comprises a curved nozzle (not shown) for changing the direction of the air source towards the air outlet 420. In some embodiments, the second air inlet 422 can be any suitable nozzle for introducing an air flow into the suction tube 414.

As shown in FIG. 4, the second air inlet 422 comprises an annular nozzle 424 which is coaxial with the suction tube 414. The annular nozzle 424 is in fluid communication with the air hose 222. The air hose 222 is coupled to a nozzle housing 426. The nozzle housing 426 surrounds the annular nozzle 424 and seals against the suction tube 414. This means that air flowing from the air hose 222 to the annular nozzle 424 does not escape outside the suction tube 414. The nozzle outlet of the annular nozzle 424 directs the air flow into the suction tube 414 and in the direction of the air outlet 420.

The pressure sensor 300 is mounted on the nozzle housing 426. The pressure sensor 300 is coupled to the suction tube 414 by connection conduit 438. In other embodiments the pressure sensor 300 can be mounted elsewhere on the suction gripper 132. For example, the pressure sensor can be mounted on the suction cup 400. In some embodiments, the pressure sensor 300 can be mounted within the nozzle housing 426. In this way, the nozzle housing 426 protects the pressure sensor 300 from being damaged.

The nozzle housing 426 is connected to the suction tube 414 either side of the annular nozzle 424. This increases the mechanical strength of the suction tube 414 and the annular nozzle 424. In some embodiments, the suction tube 414 comprises an upper part 428 and a lower part 430 which are coupled together by the nozzle housing 426. In this way, the annular nozzle 424 is sandwiched between the upper part 428 and the lower part 430. The nozzle outlet is flush with the interior wall 432 of the suction tube 414. In this way, the annular nozzle 424 does not obscure any part of the suction tube 414.

The air flow exits the annular nozzle 424 and creates an annular air flow towards the air outlet 420. Advantageously, the annular nozzle 424 creates an initial air flow with a greater surface area when compared to a point-like nozzle. Accordingly the air flow from the annular nozzle 424 entrains air from the suction tube 414 into the air flow moving towards the air outlet 420. This creates a larger air flow in the suction tube 414.

Furthermore, the annular nozzle 424 does not block the centre of the cross-section area of the suction tube 414. This means that the air flow is not blocked by the nozzle itself. This means that the suction tube is less likely to become blocked by foreign objects which ingress into the suction tube 414. Indeed, using a rod or a bottle cleaner is easier to clear blockages.

In some embodiments, the housing 426 comprises a chamber 434 for receiving the compressed air from the air hose 222. The chamber 434 may be in fluid communication with the annular nozzle 424 that intersects with the internal bore 436 of the suction tube 414. In this way, the annular nozzle 424 is not a separate element but defined by the internal walls of the housing 432 and the suction tube 414. The first and second parts 428, 430 are screw mounted in the housing 426 and spaced apart from each other to define the annular nozzle 424. The rate of flow of the compressed air into the suction tube 414 can be varied by changing the relative width of the annular nozzle 424. The width of the annular nozzle 424 can be varied by changing the separation of the first and second parts 428, 430 from each other. In particular, the first and/or the second parts can be screw mounted into the housing 426. By screwing the first and/or the second parts 428, 430 in and out of the housing 426, the relative distance between the first and second parts 428, 430 can be changed.

Accordingly, this can change the rate at which the compressed air enters the suction tube 414 and varies the suction force.

The second air inlet 422 introduces a fast, high pressure source of air into the suction tube 414. The second air inlet 422 is narrower than the suction tube 414 and so the air flow emerging from the second air inlet 422 expands into the wider volume of the suction tube 414. As the air source from the second air inlet 422 expands in the suction tube 414, it reduces in velocity and mixes with the air in the suction tube 414. The momentum of the air emerging from the second air inlet 422 mixing with the air in the suction tube 414 causes the mixed air to move towards the air outlet 420. As the air in the suction tube 414 moves towards the air outlet 420, a negative pressure is created in the suction tube between the second air inlet 422 and the first inlet 416. A negative pressure is also created in the suction cup 400 since the suction cup 400 is in fluid communication with the suction tube 414.

Depending on the quality of the seal between the suction cup 400 and the object 106c, some air will enter the suction cup 400 due to the negative pressure in the suction cup 400. Once the negative pressure is low enough, the suction gripper 132 will generate sufficient force to pick up and convey the object 106c. In some embodiments, the object 106c is released by stopping the flow of air into the suction tube 414 from the second air inlet 422. This increases the air pressure in the suction cup 400 and the object 106c will fall away from suction cup 400 due to the force of gravity.

Advantageously, the arrangement shown in FIG. 4 is a simple construction and generates the negative pressure at the suction cup 400. This means that a vacuum hose which is coupled to a vacuum pump is not required. Indeed, a smaller, lighter flexible air hose is only required to generate suction at the suction cup 400.

Figure 5:
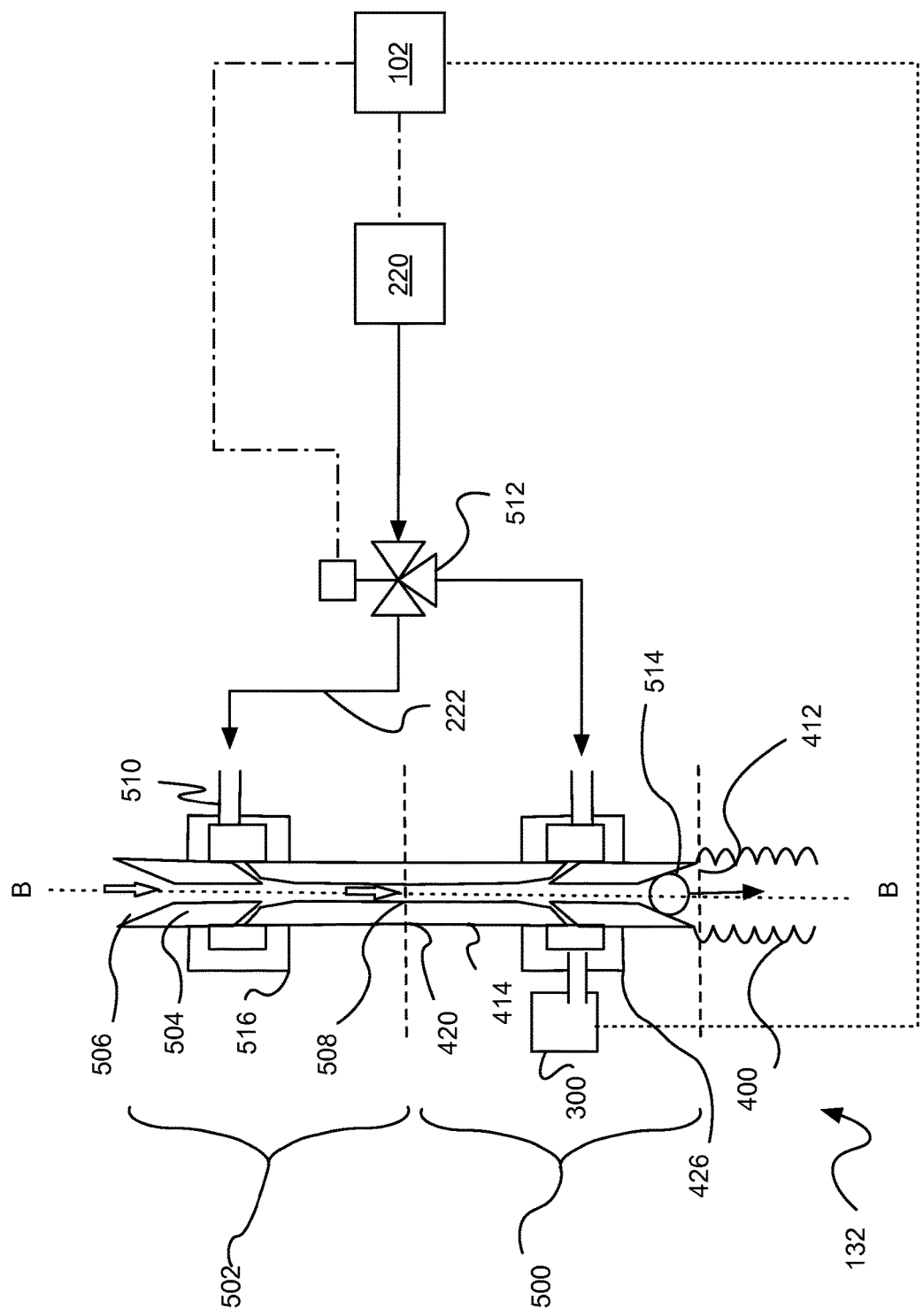
FIG. 5 shows a schematic cross-sectional view of another gripper assembly.

Turning to FIG. 5, an arrangement for unblocking the suction gripper 132 will now be discussed. FIG. 5 shows a cross-sectional side view of a modified suction gripper 132.

The suction gripper 132 is predominantly the same as the suction gripper 132 as described in the embodiments with reference to the other Figures. Indeed, the suction cup 400, the suction tube 414 and the annular nozzle 424 are the same as shown in FIG. 4.

The suction gripper 132 comprises a suction component 500 which is the same as the suction gripper 132 arrangement as shown in FIG. 4. Accordingly, the suction component 500 will not be described in any further detail. The suction gripper 132 also comprises a blow component 502. The suction cup 400, the blow component 502 and the suction component 500 are indicated by the dotted lines perpendicular to the axis B-B. The blow component 502 is the essentially the same as the suction component 500 but reversed in orientation to generate a positive air pressure rather than a negative air pressure. In some embodiments, the suction component 500 is optimized for maximum gripping/suction force. In other embodiments, the blow component 502 is additionally and/or alternatively be optimized for maximum ability to remove blockages. The arrangement as shown in FIG. 5 comprises identical components, however in alternative embodiments, the suction component 500 and the blow components are not identical.

As shown in FIG. 5, the pressure sensor 300 is mounted on the nozzle housing 426 of the suction component 500. However, in other embodiments, additionally or alternatively a pressure sensor (not shown) is mounted in the nozzle housing 516 of the blow component 502. A pressure sensor mounted on the blow component 502 can provide further information to the controller 102 as to whether there are blockages in the suction gripper 132.

The blow component 502 comprises the same features as the suction component 500. The blow component 502 comprises a blow tube 504. The blow tube 504 comprises an elongate side wall which is substantially cylindrical. The blow tube 504 comprises the first air inlet 506 at one end and an air outlet 508 at another end. The air outlet 508 is coupled to and in fluid communication with the air outlet 420 of the suction tube 414. The elongate side wall comprises a longitudinal axis B-B which is substantially parallel with the Z-axis. The longitudinal axis B-B of the blow tube 504 is the same as the longitudinal axis B-B of the suction tube 414.

Both the first air inlet 506 and the air outlet 508 of the blow tube 504 are aligned with the longitudinal axis B-B of the blow tube 504. This means that the air flow path from the first air inlet 506 to the air outlet 508 is a straight line. This means that there are no curves which impede the air flow in the blow tube 504.

Similarly to the suction tube 414, the blow tube 504 comprises a second air inlet 510 which is in fluid communication with the air hose 222. Accordingly, the second air inlet 510 of the blow tube 504 introduces an air source into the blow tube 504 between the first air inlet 506 and the air outlet 508. The second air inlet 510 is an annular nozzle similar to that described in FIG. 5. In other embodiments, the second air inlet 510 of the blow tube 504 can be any type of nozzle for introducing an air flow into the blow tube 504.

The air hose 222 is coupled to both of the second air inlets 422, 510 of the suction tube 414 and the blow tube 504 respectively. A three-way valve 512 is coupled to the air hose 222 for selectively providing an air flow to either the suction tube 414 or the blow tube 504. In some embodiments the three-way valve 512 can be replaced with two separate valves (not shown). This means that the suction gripper 132 can selectively be operated in a first mode whereby a negative pressure is provided at the suction cup 400 or a second mode whereby a positive pressure is provided at the suction cup 400. The three-way valve 512 comprises a solenoid for actuating the valve 512. The solenoid is controllable from instructions received from the controller 102. Alternatively the three-way valve could be actuated with a pneumatic control signal.

When the suction gripper 132 is in the first mode or the "suction mode", the suction gripper 132 operates in the same way as the embodiments previously discussed in reference to FIG. 4. The air flow travels from the suction tube 414 to the blow tube 504. In this way, the air flow exits the suction gripper at the first air inlet 506 of the blow tube 504. Accordingly, the first air inlet 506 of the blow tube 504 serves a dual purpose and is an air outlet in the first mode.

In the second mode, or the "blow mode", the air flow through the suction gripper 132 is reversed. Indeed, FIG. 5 shows the blow component 502 in operation and the air flow flowing from the blow component 502 to the suction cup 400. Air is drawn in from the first air inlet 506 and flows through the blow tube 504 to the suction tube 414 and exits at the air hole 412 of the suction cup 400. The positive air pressure exerts a force on a blocking object 514 causing a blockage in the suction tube 414. The force of the positive air flow can push the blocking object 514 out from the suction cup.

The suction gripper 132 has been discussed being used in combination with a waste sorting gantry robot 100. However, the suction gripper 132 can be used with any sort of wasting sorting robot 100. For example, the suction gripper 132 can be used with delta robots, robot arms or any other manipulator 104 controlled by a controller 102.

Figure 6:
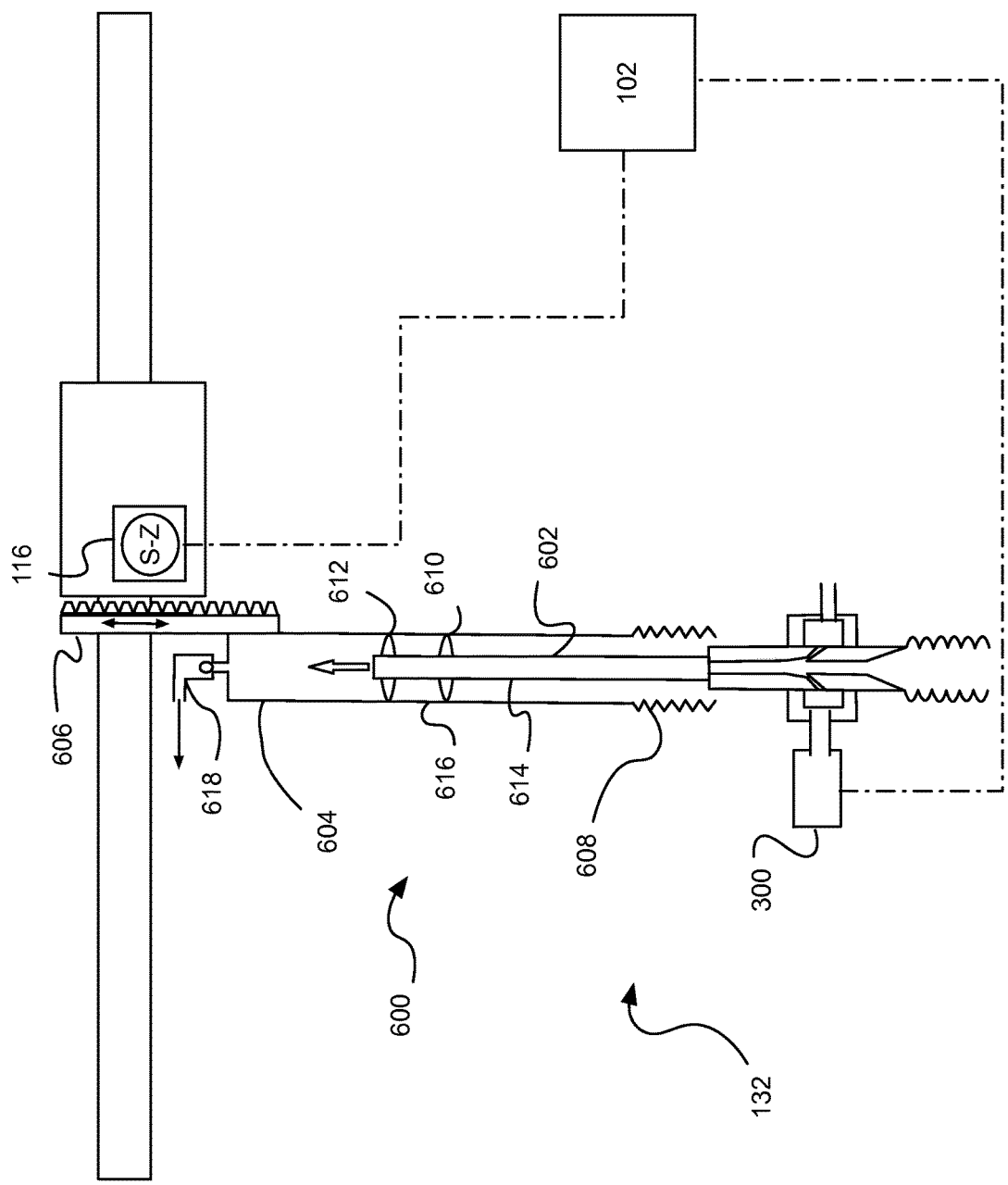
FIG. 6 shows a schematic cross-sectional view of yet another a gripper assembly.

Another embodiment will now be described in reference to FIG. 6. FIG. 6 shows a schematic cross sectional side view of the waste sorting robot. The gripper assembly 132 is mounted to the Z-axis servo 116 via a slidable coupling 600. In some embodiments, the gripper assembly 132 is mounted to the Z-axis servo via a plurality of slidable couplings 600. Indeed, other embodiments, there can be any number of slidable couplings 600 between the gripper assembly 132 and the Z-axis servo 116. For the purposes of clarity only one slidable coupling 600 is shown in FIG. 6.

The slidable coupling comprises a first part 602 coupled to the gripper assembly 132 and a second part 604 which is coupled to the Z-axis servo 116. The first part 602 is fastened to the suction tube 414 of the gripper assembly 132. In other embodiments, the first part 602 is fastened to any other component of the gripper assembly 132. The second part 604 is fastened to the rack 606 associated with a rack and pinion mechanism of the Z-axis servo 116. In some embodiments, the first and second parts 602, 604 are bolted, glued, welded, screwed respectively to the gripper assembly 132 and the rack 606 of the Z-axis servo 116 mechanism.

The first and second parts 602, 604 of the slidable coupling 600 are arranged to slide with respect to each other. The relative movement of the first part 602 and the second part 604 is in a direction which is normal to the plane of the conveyor belt 110 and/or the working area 108. In other words, the first part 602 and the second part 604 move relative to each other in the Z-axis. The first and second parts 602, 604 are elongate and each have longitudinal axis which are aligned along a longitudinal axis B-B (shown in FIG. 4). In some embodiments, the first and second parts 602, 604 are parallel with the Z-axis. In some other embodiments, the first part 602 and the second part 604 are not parallel with the Z-axis, but tilted with respect to the Z-axis. In this case when the first and second parts 602, 604 slide relative to each other, a component of the movement is in the Z-axis.

In some embodiments, the first part 602 is a rod and the second part 604 is a hollow sleeve 604 for receiving the rod 602. In some embodiments the hollow sleeve 604 and the rod 602 are aluminium extrusions, although the hollow sleeve 604 and the rod 602 can be made from any other suitable material such as steel. The slidable coupling 600 can be any suitable mechanism to let the gripper assembly 132 to move with respect to the Z-axis servo 116. For example, the first part 602 can be a hollow sleeve and the second part 604 can be a rod. In other embodiments, both the first and second parts 602, 604 can both be elongate elements, for example, rods which are slidably coupled to each other. The rods (not shown) can be arranged side by side and slide against their respective exterior surfaces. In other embodiments, the slidable coupling 600 can be a "lazy tongs" scissor mechanism.

In some embodiments, the first part 602 is slidably coupled to the second part 604 by virtue of a plurality of wheels (not shown). In some embodiments, there are a plurality of sets of wheels arranged to engage the exterior surface 614 of the rod 602 at a plurality of locations along the rod 602. Each set of wheels comprises wheels to keep the rod 602 aligned along the longitudinal axis of the hollow sleeve 604. The wheels can protrude slightly through the hollow sleeve 604. However, in other embodiments the wheels can be mounted within the hollow sleeve 604 between the rod 602 and the interior surface 616 of the hollow sleeve 604. The bearings of the wheels are coupled to the hollow sleeve 604 to fix the rotation of axis of the wheels with respect to the hollow sleeve 604. In other embodiments, the bearings of the wheels are coupled to the rod 602.

In operation, the Z-axis servo 116 lowers the gripper assembly 132 towards an object 106a, 106b, to be picked. As the gripper assembly 132 engages the surface of the object 106a, the first part 602 and the second part 604 of the slidable coupling 600 move with respect to each other. At the point at which an object 106a, 106b, 106c is detected by the controller 102, the controller 102 sends a signal to the Z-axis servo 116 to stop moving towards the conveyor belt 110 and start moving up and away from the conveyor belt 110. Due to the inertia of the suction gripper 132 and the whole Z-axis servo mechanism 116 moving downwards, the suction gripper 132 will take a period of time before the suction gripper 132 actually starts to move upwards. This means that the suction gripper 132 moves downwards for a period of time before the Z-axis servo 116 moves the suction gripper 132 upwards. As the suction gripper 132 moves downwards, the slidable coupling 600 contracts and the suction gripper 132 is not forced into the object 106a, 106b to be picked or the conveyor belt 110. In this way, the slidable coupling 600 is a shock absorber that protects the manipulator 104 from collision with conveyor belt 110 or objects 106a, 106b. This prevents damage to the manipulator 104 and/or the conveyor belt 110. Furthermore, since the slidable coupling 600 slides, the objects 106a, 106b to be picked are not crushed and this increases the likelihood that the suction gripper 132 makes a successful pick.

In some embodiments, the conveyor belt 110 is made from material that does not form a good seal with the suction cup 400. The conveyor belt 110 may be made from an air permeable material or a porous material. In some embodiments, the surface of the conveyor belt 110 has a rough surface which prevents the suction cup 400 from making a good seal against the conveyor belt 110. In this way if the suction cup 400 engages with the conveyor belt 110, the suction gripper 132 is not damaged or the conveyor belt 110 is not damaged from the manipulator 104 lifting the suction gripper 132 upwards. Additionally or alternatively, the suction gripper 132 is configured to lower to a position just above (e.g. a few millimetres above) the conveyor belt 110 so that the suction cup 400 does not physically engage the conveyor belt 110 when the slidable coupling 600 is fully extended.

In some embodiments, the slidable coupling 600 comprises a rubber protective sleeve 608 which covers the slidable coupling 600. In this way the rubber protective sleeve 608 prevents dust and other debris damaging the slidable coupling mechanism 600. Furthermore, the rubber protective sleeve helps absorb collision energy.

The rod 602 of the first part comprises a first seal 610 and optionally a second seal 612. The first and second seals 610, 612 engage both the exterior surface 614 of the rod 602 and an interior surface 616 of the hollow sleeve 604. The seals 610, 612 are fixed to the exterior surface 614 of the rod 602 and the seals 610, 612 slide along the interior surface 616 of the hollow sleeve 604. Alternatively the seals 610, 612 are fixed to the interior surface 616 of the hollow sleeve 604 and slide with respect to the exterior surface 614 of the rod 602. Accordingly, the seals 610, 612 make a seal between the rod 602 and the hollow sleeve 604. The seals 610, 612 restrict the airflow between the rod 602 and the hollow sleeve 604 to act as a shock absorber. In this way, rod 602 and the hollow sleeve 604 form a pneumatic shock absorber. The air in the hollow sleeve 604 is trapped by the seals 610, 612 and creates a piston.

The hollow sleeve comprises a valve 618 for selectively controlling the airflow out and in of the hollow sleeve 604. In some embodiments, the valve 618 is a ball valve 618 which allows air to freely escape from the hollow sleeve 604 when the rod 602 is compressed into the hollow sleeve 604. When the rod 602 is pulled out of the hollow sleeve 604, the ball valve 618 limits the rate that air can re-enter the hollow sleeve 604. In alternative embodiments, the valve can be a rubber flap (not shown) which rests over an air hole connected to the interior of the hollow sleeve 604. The rubber flap flexes away from the hollow sleeve 604 when air exits the hollow sleeve 604. When the rod 602 extends from the hollow sleeve 604, the rubber flap covers the air hole and slowly lets air enter the hollow sleeve 604.

Figure 8:
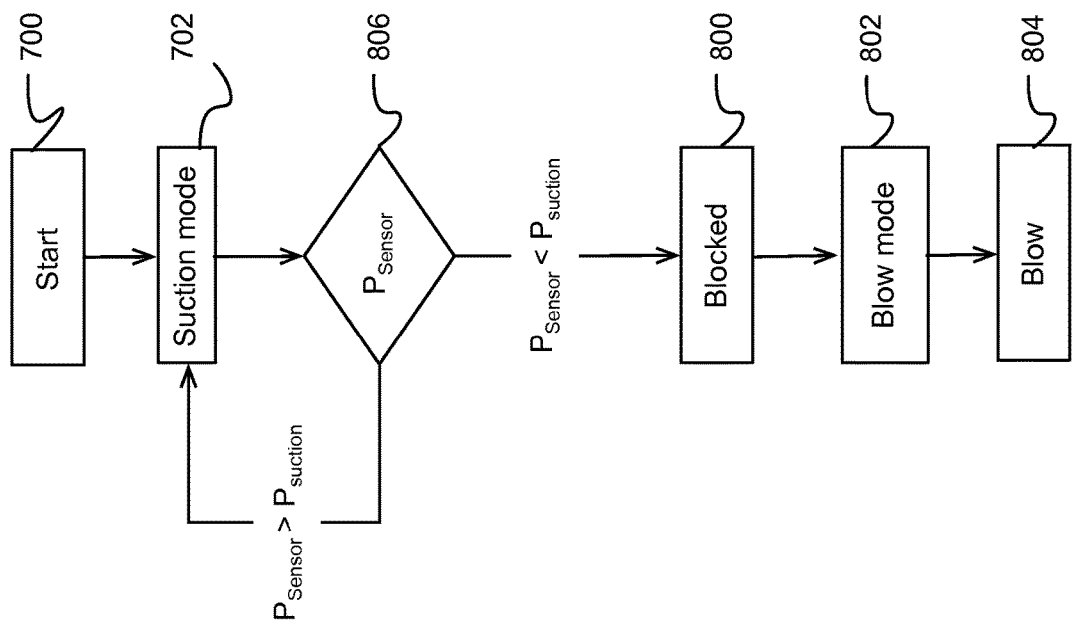
FIG. 8 shows another flow diagram of a method used by a gripper assembly.
Figure 9:
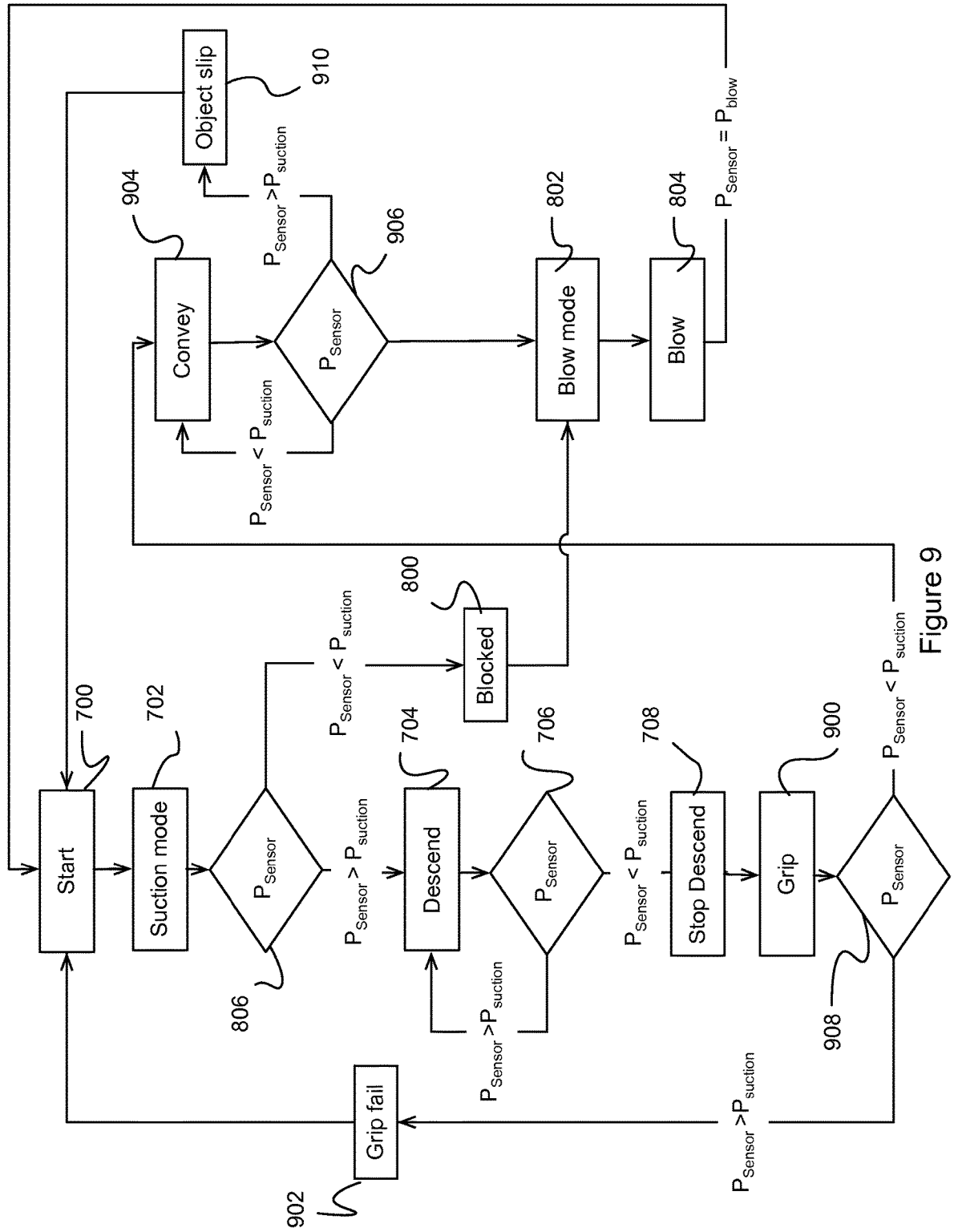
FIG. 9 shows another flow diagram of a method used by a gripper assembly.
Figure 10:
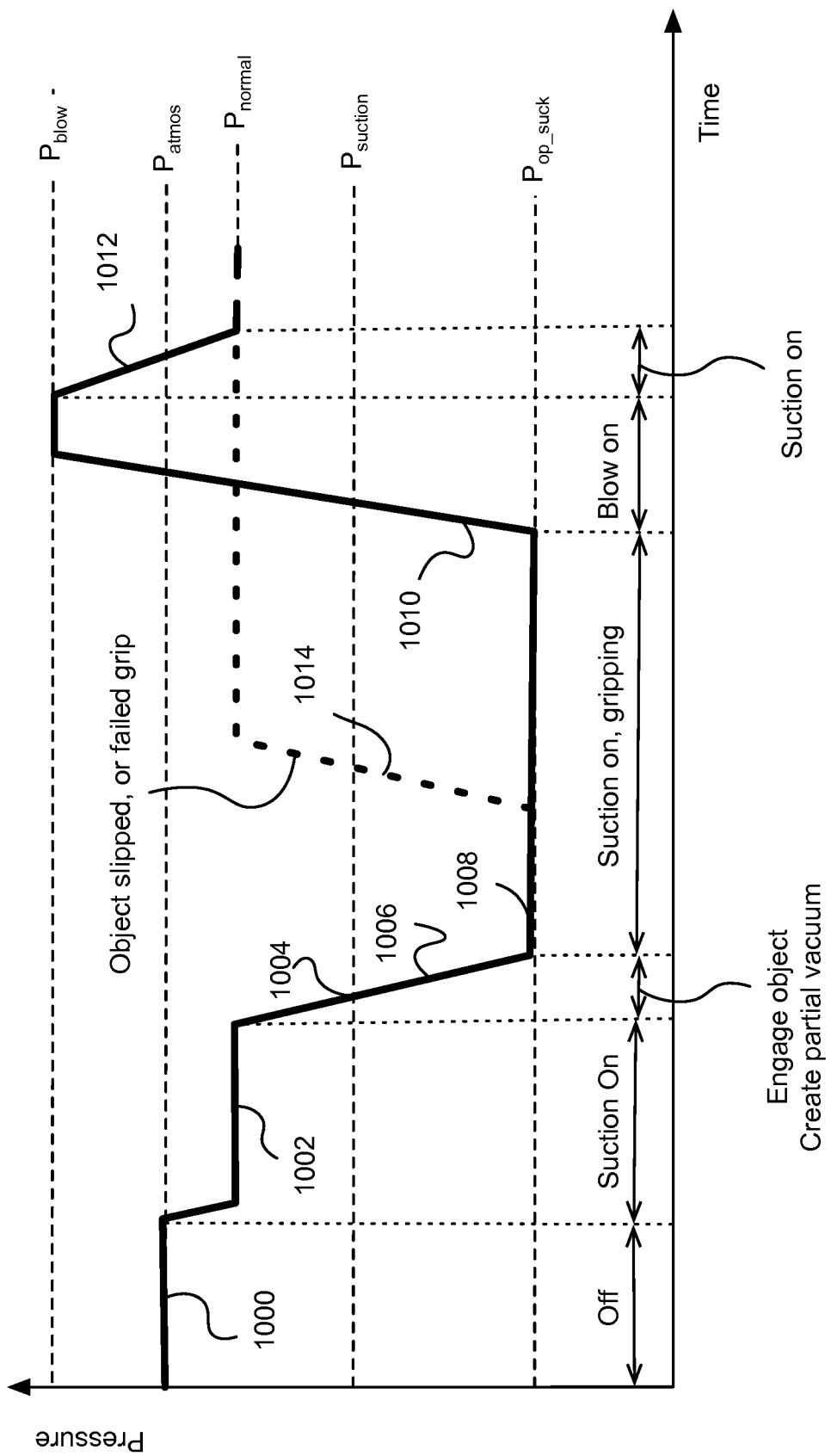
FIG. 10 shows a schematic graph of the pressure of the gripper assembly during operation.

Operation of the waste sorting robot 100 will now be described in reference to FIGS. 7 to 11. FIGS. 7 to 9 and 11 show a schematic flow diagram of a method of controlling the waste sorting robot 100. FIG. 10 is a schematic graph of the pressure of the suction gripper 132 over time during operation of the suction gripper 132.

Figure 7:
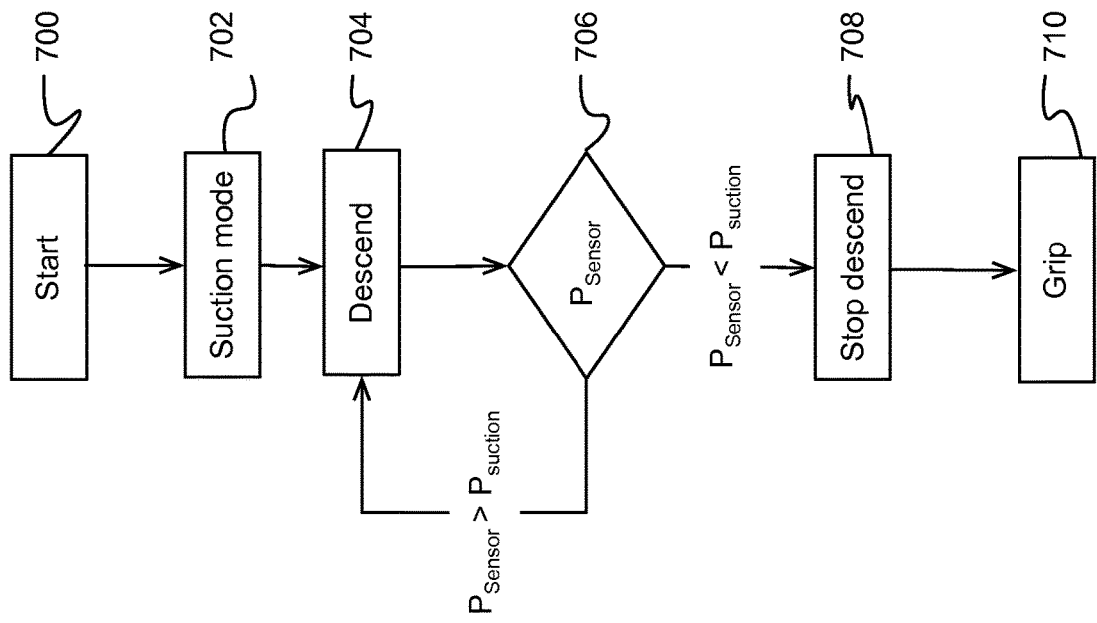
FIG. 7 shows a flow diagram of a method used by a gripper assembly.

Turning to FIG. 7, one embodiment will now be discussed. Optionally, in step 700 the manipulator 104 of the waste sorting robot 100 is in a "start" position. The start position can be any position of the manipulator 104 before the pick operation is carried out. For example, after an object 106c has been picked and disposed down a chute 138, and there is no immediate next object to pick, the waste sorting robot 100 can either stop, or do something else.

In some embodiments, if the waste sorting robot 100 stops after a pick, this means the manipulator 104 is left standing near a chute 138. When the next object 106a, 106b comes, the manipulator 104 moves from the start position which is the position the manipulator 104 is in after the preceding pick was completed.

If the controller 102 determines that there is another pick to carry out immediately after the preceding pick, then the start position will be the finishing position of the preceding pick. In this way, the start position it not a fixed position with respect to the gantry frame 120, but will vary depending on the decisions that the controller 102 makes.

The controller 102 can decide after a previous pick where to move the manipulator 104. If controller 102 has no next pick, then the controller 102 decides to move to the manipulator 104 to a position to wait for the next object. In this way, the position where the manipulator 104 waits for the next object will be the start position for the next pick. If the controller 102 decides to move the manipulator 104 to a waiting position, the start position can be optionally a predetermined position of the manipulator 104 in which the manipulator 104 is moved to before a manipulator 104 movement is carried out. In some embodiments, the start position is a predetermined position in reference to the frame 120 and/or the working area 108. In some embodiments, the start position is a predetermined "home" position in the middle of the conveyor belt 110 and/or the working area 108 where the waste objects to be sorted enter the working area 108. In this way, the start position is a ready position which is the best position to wait for the next object 106a, 106b in order to reduce the travel time of the manipulator 104.

In some embodiments, the controller 102 may know the location of the manipulator 104 with sub-millimetre accuracy. Information relating to the position of the manipulator 104 is sent to the controller 102 from one or more encoders from the rear end of the servos 112, 114, 116. In some other embodiments, the location of the manipulator is determined additionally or alternatively to an encoder in the servo 112, 114, 116. For example, the location of the manipulator 104 is determined from one or more other sensors (not shown) such as a camera or a proximity sensor mounted on the manipulator 104 or on the conveyor belt 110. In some embodiments, the controller 102 may be connected to one or more sensors for determining the position of the manipulator 104. Optionally the position sensor may be an encoder in a servo, a camera, a proximity sensor, an optical sensor, an infrared sensor, an ultrasound sensor, a laser distance sensor, a hall sensor, or any other suitable sensor for determining the position of the manipulator 104 and/or the suction gripper 132. The at least one position sensor may be mounted on the manipulator 104 or the suction gripper 132 alternatively, the at least one position sensor may be mounted remotely from the manipulator 104 or the suction gripper 132. In some embodiments there is at least one position sensor configured to generate a position signal in dependence of the position of the manipulator 104 and/or the suction gripper 132. In some embodiments the at least one position sensor is configured to send the position signal in dependence of the position of the manipulator 104 and/or the suction gripper 132 to the controller 102.

In some embodiments, the waste sorting robot 100 optionally comprises at least one synchronising switch (not shown) which is located at a known reference location on the gantry frame 120. Whenever the axis drives past that switch, the controller 102 can verify whether the servo 112, 114, 116 drive's position matches with the known physical location of the synchronising switch. This means that if some gear, clutch or belt between the servo 112, 114, 116 and the suction gripper 132 slips, the position derived from the position of the servo motor no longer in synchronisation with the actual location of the suction gripper 132. If the controller identifies a mismatch, the controller 102 can stop waste gantry sorting robot 100 from operating. In some embodiments, the synchronising switches are located around the start position as mentioned above.

If the pneumatic system 220 is not in operation prior to step 700, then the pressure in the suction cup 400 as detected by the pressure sensor 300 will be atmospheric pressure ($P_{atmos}$). This is show as the horizontal line 1000 in FIG. 10.

After step 700, the controller 102 initiates a pick of an object 106a, 106b, 106c. In this case, the controller 102 operates the suction assembly 132 so that the suction assembly operates in a suction mode as shown in step 702. In particular, the controller 102 sends a control signal to the valve 512 to select the valve 512 in a suction mode. In the suction mode, compressed air is introduced into the second air inlet 422 of the suction component 500. Accordingly the suction gripper assembly 132 creates a negative pressure in the suction cup 400. This means that the suction gripper 132 is ready for a pick.

In step 702, as the air flow in the suction tube 414 creates the suction, the pressure in the suction cup 400 will drop slightly from normal atmospheric pressure $P_{atmos}$ to an operating pressure $P_{normal}$ as shown as horizontal line 1002 in FIG. 10. The drop in pressure will only be slight because there is no obstruction in the suction cup 400 and therefore replacement air will flow into the suction cup 400 constantly.

When the controller 102 initiates the pick operation, the manipulator 104 is in a start position. If the particular start position of the manipulator 104 and the suction gripper 132 for the current pick is above the conveyor belt 110, this means that the manipulator 104 must descend to the conveyor belt 110 so that the suction cup 400 is able to physically engage with the object to be sorted 106a, 106b, 106c. In normal operation, the manipulator 104 moves the suction gripper 132 at a height above the conveyor belt 110 not to collide with any objects 106a, 106b, 106c. When the waste gantry sorting robot 100 begins a pick, it moves the suction gripper 132 above the object to be picked. This motion is advantageously carried out in a way so as to not hit any other objects on the way. In some embodiments, during the motion or after stopping the manipulator 104 above the object, the suction is turned on as shown in step 702. The controller 102 sends a movement instruction to the servos 112, 114, 116 to move the manipulator 104. In particular the Z-axis servo 116 is actuated to move the suction gripper 132 in a downwards direction as shown in step 704. This operation will still have the same pressure as in step 702 as shown by line 1002 in FIG. 10.

Whilst the suction gripper 132 is descending, the controller 102 optionally performs a pressure status check of the suction gripper 132 as shown in step 706. During the pressure status check 706, the controller 102 receives pressure information from the pressure sensor 300. The pressure sensor 300 obtains information relating to the pressure status in the suction cup 400. The pressure sensor 400 can measure one or more parameters of the pressure in the suction cup 400. In one embodiment, the pressure sensor 300 measures the magnitude of the pressure in the suction cup 400. That is, the pressure sensor 300 detects whether the pressure is a positive or negative pressure relative to atmospheric pressure and the size of the relative pressure. The pressure sensor 300 may measure the absolute pressure in the suction cup 400 or may determine a relative pressure of the suction cup 400 with respect to atmospheric pressure. A relative pressure of the suction cup 400 is compared for example the pressure measurement of the suction cup 400 before the pneumatic system 220 is in operation or e.g. atmospheric pressure. In some embodiments, the pressure sensor 300 determines the rate of change of the pressure in the suction cup 400.

Determining the rate of change of the pressure in the suction cup 400 may be useful because a sudden rate of change can indicate that the status of the suction gripper has changed. For example is the suction cup 400 has suddenly physically engaged an object, the pressure will drop rapidly to a negative pressure (e.g. 150 mBar below atmospheric pressure).

If the controller 102 determines in step 706 that the pressure information indicates that the suction gripper 132 has not engaged an object to be sorted, the controller 102 continues to instruct the manipulator 104 to descend to the conveyor belt 110. This is represented by an arrow between step 706 and step 704 labelled $P_{sensor} > P_{suction}$. In some embodiments the controller 102 compares a pressure measurement received from the pressure sensor 300 with a threshold suction pressure ($P_{suction}$). The threshold suction pressure is a predetermined pressure of a partial vacuum required in the suction cup 400 which will generate sufficient suction force to life objects to be sorted 106a, 106b, 106c on the conveyor belt 110.

In some embodiments, the threshold suction pressure $P_{suction}$ may be a pressure which is not large enough to generate a suction force. In this way, the threshold suction pressure $P_{suction}$ is a pressure that distinguishes between the suction cup 400 not being engaged with an object and the suction cup 400 engaging with an object. Once the controller 102 determines that the pressure in the suction cup 400 is below the threshold suction pressure $P_{suction}$, the controller 102 decrease the pressure in the suction cup 400 to generate a suction force and a lifting force on the object.

In some embodiments, the threshold suction pressure is 150 mBar below atmospheric pressure. The threshold suction pressure can be any suitable negative pressure required to generate a suction force to lift an object. In some embodiments, the lifting force can be between 10 N to 50 N. As the air flow in the suction tube 414 creates the suction, the pressure in the suction cup 400 will drop from normal atmospheric pressure to the operating pressure $P_{normal}$, but the pressure not will not go below the threshold suction pressure indicating a partial vacuum has been formed between the suction cup 400 and the object 106a, 106b, 106c. The drop in pressure from the operating pressure $P_{normal}$ 1002 to a negative pressure during a picking operation is shown as a rapidly decreasing pressure line 1006 in FIG. 10.

In some embodiments, the controller 102 may be continuously receiving a pressure signal from the pressure sensor 300. In other embodiments, the controller 102 receives the pressure signal periodically, for example at a frequency of 1000 Hz (every 1 ms). The frequency of the controller 102 polling the pressure sensor 300 can be increased if the controller 102 needs to determine changes in the pressure more rapidly.

In some embodiments, the controller 102 uses the pressure signal from the pressure sensor 300 to control the airflow in the second air inlet 422 and the suction force in the suction gripper 132. This means that the controller 102 varies the suction force generated by the suction gripper 132 in dependence of the pressure signal. In this way, the controller 102 uses the pressure signal in a control feedback loop for varying the suction force of the suction gripper 132. For example, the controller 102 can determine from the pressure signal that the pressure in the suction cup 400 is increasing, accordingly the controller 102 can determine that the grip of the picked object is becoming less secure. In order to increase the likelihood of a successful pick, the controller 102 can increase the suction force of the suction gripper 132 to make the engagement of the suction gripper 132 with the picked object more secure. In this way, less compressed air may be used if the seal is good while still being able to grip if the seal is bad. Using less compressed air is preferable because it requires a significant amount of electricity to generate the compressed air.

The controller 102 determines in step 708 that the pressure in the suction cup 400 is below a threshold suction pressure $P_{suction}$. Accordingly, the controller 102 determines that the pressure has dropped in the suction cup 400 is because the suction gripper 132 has engaged the surface of an object 106a, 106b, 106c. This is represented by the intersection 1004 in FIG. 10.

In step 710, the controller 102 determines that the pressure in the suction cup 400 is maintained below the threshold suction pressure $P_{suction}$ and the object has been successfully gripped by the suction gripper 132. This is shown in FIG. 10 by the horizontal line 1008 below the threshold suction pressure $P_{suction}$. In this way, the controller 102 determines that the status of the suction gripper 132 is gripping an object.

In an alternative embodiment, the controller 102 determines that the suction gripper 132 has physically engaged an object 106a, 106b, 106c based on the rate of change of the pressure in the suction cup 400. In this way, the controller 102 can determine faster that the suction gripper 132 has successfully gripped an object. This is because the rate of change of the pressure in the suction cup 400 will be a function of how well the suction cup 400 seals against the surface of the object 106a, 106b, 106c. Accordingly, if the suction cup 400 has a good seal the pressure will drop quicker in the suction cup 400. This means that the controller 102 can determine that the suction gripper 132 is gripping the object before the magnitude of the pressure in the suction cup 400 has actually fallen below the threshold suction pressure $P_{suction}$. In other embodiments, signal processing such as filtering can be used on the pressure signal by the controller 102 to determine a status of the suction gripper 132.

The controller 102 determines the rate of change of the pressure in the suction cup 400 based on the pressure information. If the rate of change of the pressure is greater than a predetermined rate of pressure change, then the controller 102 determines that the suction gripper 132 is gripping an object. Once the controller 102 has determined that the suction gripper 132 is successfully gripping the object, the controller 102 sends a movement command to the manipulator 104. Specifically the controller 102 sends a movement command to the Z-axis servo 116 to reverse the movement of the suction gripper 132 towards the conveyor belt 110 such that the suction gripper 132 moves away from the conveyor belt 110.

Since the controller 102 and the Z-axis servo 116 have a latency between the controller 102 issuing an instruction and the Z-axis servo 116 performing the movement due to signalling lag as well as mechanical limitations that require the Z-axis servo 116 servo to use a limited amount acceleration and/or jerk when changing direction, the controller 102 can use the determination that the rate of change of the pressure in the suction cup 400 to change the direction of the suction gripper 132.

This is because when the Z-axis servo receives the instruction to move the suction gripper 132 away from the conveyor belt 110, enough time has passed for the pressure in the suction cup 400 to be below the threshold suction pressure $P_{suction}$. This means that the manipulator 104 action of descending, gripping and ascending can be sped up.

Another embodiment of operation of the manipulator 104 and the suction gripper 132 will now be discussed in reference to FIG. 8. FIG. 8 shows a method of operating the suction gripper 132 in order to unblock the suction tube 414.

Steps 700, and 702 are the same in FIG. 8 as in FIG. 7. However, in some instances the suction gripper 132 may not be operating correctly when the controller 102 controls the pneumatic system 220 and supplies air to the suction tube 414. For example, it is possible that the suction gripper 132 is blocked by debris before the suction gripper 132 performs a pick.

Similar to step 706 in FIG. 7, the controller 102 receives pressure information from the pressure sensor 300. Accordingly, when the controller 102 receives pressure information from the pressure sensor 300, the controller 102 determines that the pressure of the suction cup 400 is not operating at a normal operating pressure $P_{normal}$ when the suction gripper 132 is in the start position as shown in check step 806. For example, the determined pressure is below the normal operating pressure $P_{normal}$. This indicates that the suction tube 414 is fully or partially blocked. If the controller 102 determines that the suction gripper 132 is operating normally, then the controller 102 returns to step 702.

In some embodiments, the controller 102 performs the check step 806 on the suction gripper 132 when the suction gripper 132 is known not to be gripping an object 106a, 106b, 106c. For example, the controller 102 can perform the check step 806 of the pressure of the suction cup 400 before the picking operation is carried out. The controller 102 can carry out the suction gripper check step 806 in the start position.

In other embodiments, the controller 102 carries out a suction gripper check step 806 after other trigger events. For example, if the controller 102 determines that a pick has been unsuccessful or the suction gripper 132 has malfunctioned. In some embodiments, the controller 102 may perform the suction gripper check 806 after the suction gripper 132 has failed to successfully pick an object a predetermined number of times (e.g. after five unsuccessful picks). In other embodiments, the check step 806 is performed at any time during operation of the suction gripper 132. In yet other embodiments, the check step 806 is carried out whenever there are no objects to pick. In this way, the controller 102 can use time when the manipulator 104 is not carrying out a pick to ensure the suction gripper 132 is not blocked. As shown in FIGS. 8 and 9, the check step 806 is performed before the manipulator 104 descends in step 704.

In some embodiments, the controller 102 performs the suction gripper check step 806 when the suction gripper 132 is remote from the conveyor belt. This means that the controller 102 can use the pressure information to distinguish between a successful gripping operation as shown in FIG. 7 and a blockage.

Accordingly, the controller 102 determines that the suction gripper 132 is blocked based on the pressure information as shown in step 800. Optionally as mentioned above, the controller can additionally use other information such as the position, movement and status of the manipulator to determine that the suction gripper 132 is blocked.

Once the controller 102 has determined that the suction gripper 132 is blocked, the controller 102 can take remedial action to unblock the suction gripper 132. In this case, the controller 102 operates the suction gripper 132 so that the suction gripper 132 operates in a blow mode as shown in step 802. In particular, the controller 102 sends a control signal to the valve 512 to select the valve 512 in a blow mode.

In the blow mode, compressed air is introduced into the second air inlet 510 of the blow component 502. Accordingly the suction gripper assembly 132 creates a positive pressure in the suction cup 400. This means that the airflow is reverse through the suction gripper 132 and pushes the blocking object 514 out of the suction cup 400 as shown in step 804. The pressure of the suction cup 400 is shown in FIG. 10 by the line 1010 indicating the rapidly increasing pressure and the short burst of positive, above atmospheric pressure.

Optionally, the controller 102 can position the manipulator 104 so that the blocking object 514 is fired clear of the conveyor belt 110. Once the blockage has cleared, the controller 102 can instruct the manipulator 104 to the start position as shown in FIG. 7. Operating the suction gripper 132 at the normal operating pressure, $P_{normal}$ after $P_{blow}$ is shown by line 1012 in FIG. 10.

A further embodiment will now be discussed with respect to FIG. 9. Steps of the methods of operations as discussed with respect to the embodiments shown in FIGS. 7 and 8 are incorporated into FIG. 9. The steps which are the same to the previously discussed steps have the same reference number and will not be described again.

As mentioned, the operation of gripping an object is the same as shown in FIG. 7. However once the suction gripper 132 has physically engaged the object 106a, 106b, 106c, it is possible that the grip fails. For example, the seal between the suction cup 400 and the object is not good enough. This may be caused by, for example, the object having a rough surface, an increased object porosity, an edge of the suction cup 400 overlapping the edge of the object 106a, 106b, 106c, or the seal between the suction cup 400 and the object 106a, 106b, 106c is not good enough. Another possible reason for a failing grip is that the object is too heavy. The grip may further fail because the centre of gravity of the object is too far from the suction gripper 132. Indeed, the relative position of the suction gripper 132 with respect to the object 106a, 106b, 106c may not be optimal. In these cases, the suction force generated by the suction gripper 132 is not sufficient and the object falls away from the suction gripper 132 as the manipulator 104 moves away from the working area 108.

In this case, it is advantageous that the controller 102 knows that the object is no longer being gripped by the suction gripper 132. Accordingly the controller 132 can determine that the grip has failed based on pressure information received from the pressure sensor 300. In this way, the grip step 900 comprises a grip check step 908, similar to step 706. The grip check step 908 continues once the suction gripper 132 has physically engaged the object.

If the controller 102 determines that the pressure rises rapidly during the grip check step 908, the controller 102 determines that the grip has failed as shown in step 902. The controller 102 determines from the pressure information that the pressure in the suction cup 400 is above the threshold suction pressure $P_{suction}$ and therefore no object is being gripped by the suction gripper 132. The rapid rise in the pressure from the operating suction pressure $P_{op\_suck}$ to the normal operating pressure $P_{normal}$ at the suction cup 400 is shown by the dotted rising line 1014 in FIG. 10. Additionally or alternatively, the controller 102 waits a period of time, e.g. 150 ms before determining that the suction gripper 132 has failed to grip an object. If the controller 102 determines that there has been a grip failure in step 902, the controller 102 may optionally send instructions to move the manipulator 104 to pick an object in the vicinity of the current location of the manipulator 104.

Alternatively, once the controller 102 determines that the grip has failed, the controller 102 can instruct the manipulator 104 to start a new picking operation if a suitable object 106a, 106b, 106c is available and the start position is wherever the manipulator 104 is currently located. This means consecutive picks start at the position where the previous pick attempt ended. Alternatively, if no new object is available, the controller 102 instructs the manipulator 104 to go to the home position to wait for an object 106a, 106b to become available when carried into the working area 108 by the conveyor belt 110.

If the controller 102 determines that the status of the suction gripper 132 is that an object 106a, 106b, 106c is being held, the controller 102 instructs the manipulator 104 to convey the object 106a, 106b, 106c to the chute 138 as shown in step 904. Once the manipulator 104 is conveying the object, the object 106a, 106b, 106c has been lifted off the conveyor belt 110 and is moved relative to the conveyor belt 110 at a height above the conveyor belt 110.

However, during a conveying operation step 904, it is possible that the suction gripper 132 does not maintain a successful grip on the object. This may be for similar reasons that the grip failed in step 902.

Accordingly, the controller 102 may perform a conveying grip check step as shown in step 906. This step in 906 is the same as to the grip check 908 previously discussed in reference to FIG. 9. If the pressure of the suction cup 400 rapidly rises during the conveying step, the controller 102 determines that an object has slipped off the suction gripper 132 as shown in step 910. The rapid rise in the pressure from the operating suction pressure $P_{op\_suck}$ to the normal operating pressure $P_{normal}$ at the suction cup 400 is shown by the dotted rising line 1014 in FIG. 10. Once the controller 102 determines that an object has slipped off the suction gripper 132, the controller 102 instructs the manipulator 104 to the start position in step 700 for another picking operation as previously discussed.

If the conveying operation in step 904 is successful, the manipulator 104 moves the picked object 106c over the chute 138 or proximal to the chute 138. At this point the controller 102 can release the picked object 106c into the chute 138. In some embodiments, the controller 102 drops the picked object 106c by stopping the air supply to the suction tube 414. In this way, the suction force is removed from the suction gripper 132 and the picked object 106c will fall under the force of gravity into the chute 138.

Alternatively or additionally, the controller 102 can reverse the airflow through the suction tube 414 so that the picked object 106 is blown off the suction gripper 132. To blow the picked object 106c from the suction gripper 132, the controller 102 operates the suction gripper 132 in the blow mode as shown in step 802. The blow operation is shown in step 804 and has been previously discussed in reference to FIG. 8. Optionally, the controller 102 can implement the blow or release operation in step 804 whilst the manipulator is moving towards the chute 138. Accordingly, the picked object 106c is "thrown" to the chute 138. This can be advantageous because the manipulator does not have to travel as far, increasing the number of picks that can be made by the waste sorting robot 100.

In some embodiments, the controller 102 instructs a blow operation 804 to be carried out after each pick whether it is successful or not. In this way, the positive airflow through the suction tube 414 is constantly cleaning the debris from the suction tube 414. This ensures that a build-up of debris in the suction tube 414 does not occur.

Figure 11:
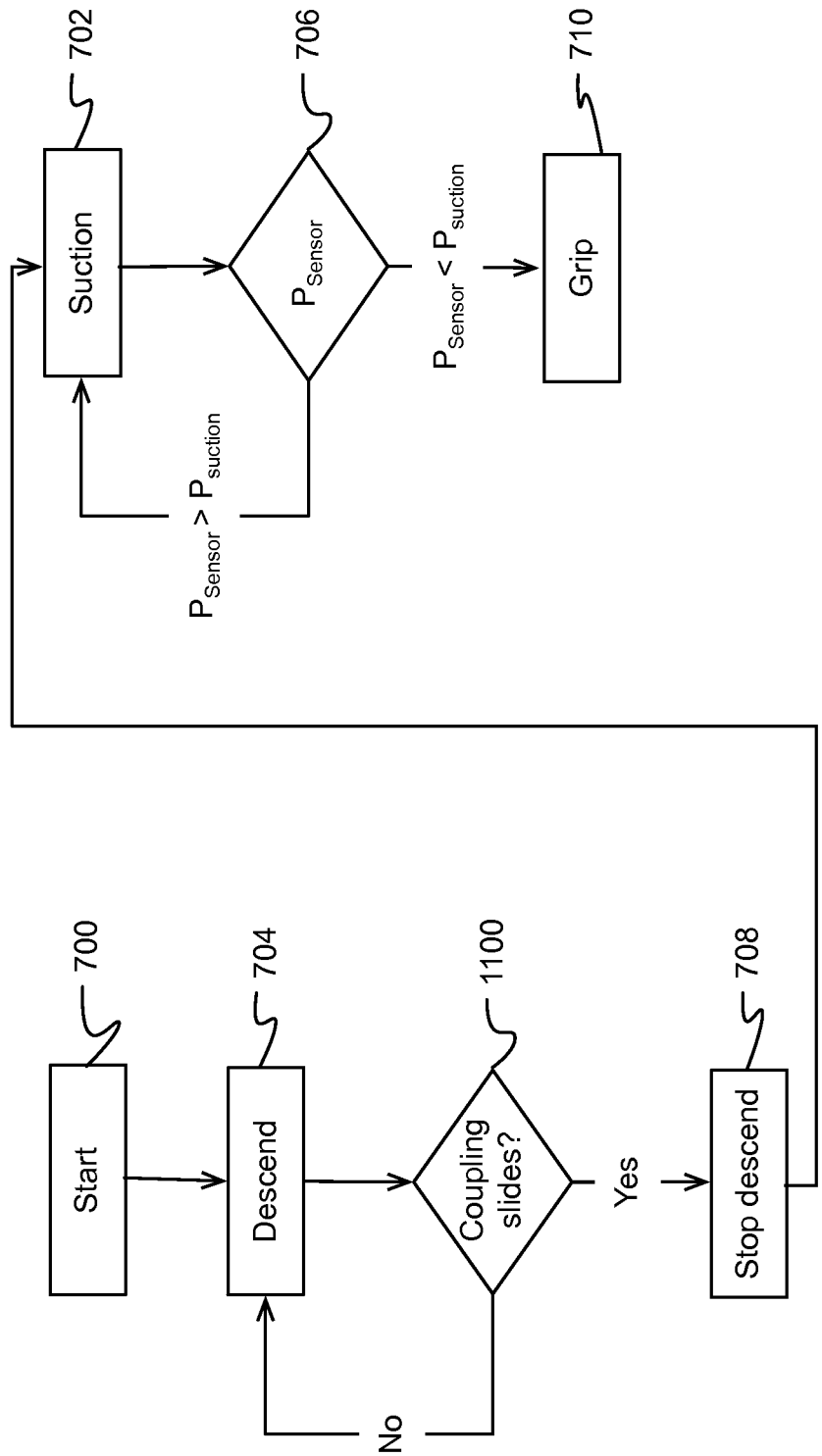
FIG. 11 shows a flow diagram of a method used by a gripper assembly.

Another embodiment will now be discussed in reference to FIG. 11. FIG. 11 shows a schematic flow diagram of a method of operation of the suction gripper 132. The method is the same has FIG. 7 except that some of the method steps are in a different order. In particular, the suction step 702 does not immediately start once the manipulator 104 is in the start position. Indeed, the suction gripper 132 descends towards the conveyor belt 110 with the source of compressed air turned off. In this way, the suction gripper 132 is not creating a suction force whilst the suction gripper 132 descends.

The controller 102 determines that the suction gripper 132 has physically engaged the object when the slidable coupling 600 starts to slide. The controller 102 receives a signal from at least one sensor configured to detect relative motion between the first and second parts 602, 604 of the slidable coupling 600. The sensor detects that the suction gripper 132 has moved between a first position and a second position relative to the manipulator 104. The at least one sensor can be a microswitch, an optical sensor to detect relative movement, an ultrasonic distance sensor, an infrared sensor, a stress/strain gauge a pressure sensor coupled to the ball valve 618 to detect air being urged out of the hollow sleeve 604 when the slidable coupling 600 compresses or any other suitable sensor for detecting relative movement between the first and second part 602, 604. The controller 102 controls the Z-axis servo 116 to move the suction gripper 132 downwards until the controller receives a signal from the at least one sensor that the slidable coupling 600 has started to slide as shown in step 1100. In response to the signal, the controller 102 starts the suction in step 702. In this way, the compressed air supply is only turned on when the suction cup 400 is physically engaging the object. The controller 102 before or after the suction step 702 also stops the downward movement of the suction gripper 132 as shown in step 708. The rest of the steps of the method are the same as previously discussed.

In other embodiments, the suction gripper arrangements as described with respect to the FIGS. 1 to 6 and the operation of the suction grippers discussed in reference to FIGS. 7 to 9 and 11 can also be used with other types of object manipulation robots. For example, the suction gripper 132 can be used with industrial robots in the automotive industry, food industry etc. In this the way the suction gripper and method of controlling the manipulator and suction gripper can be used with a sorting robot for sorting objects.

In another embodiment two or more embodiments are combined. Features of one embodiment can be combined with features of other embodiments.

Embodiments of the present invention have been discussed with particular reference to the examples illustrated. However it will be appreciated that variations and modifications may be made to the examples described within the scope of the invention.

The invention claimed is:

1. A waste sorting robot comprising:
    a manipulator comprising a suction gripper configured to interact with one or more waste objects to be sorted within a working area, and wherein the manipulator is moveable within the working area;
    a controller configured to send control instructions to the manipulator;
    at least one pressure sensor in fluid communication with the suction gripper and configured to generate a pressure signal in dependence on a fluid pressure in the suction gripper; and at least one position sensor mounted on the suction gripper configured to generate a position signal in dependence on a position of the suction gripper;

wherein the controller is configured to receive the pressure signal and the position signal and to determine manipulator instructions in dependence on the pressure signal and the position signal.

2. A waste sorting robot according to claim 1 wherein the at least one pressure sensor is mounted on the suction gripper.

3. A waste sorting robot according to claim 1 wherein the at least one pressure sensor is configured to measure pressure in a suction cup of the suction gripper.

4. A waste sorting robot according to claim 1 wherein the controller is configured to detect at least one of: whether the pressure in the suction gripper is below a threshold suction pressure, a rate of change of the pressure rises above a threshold change rate, signal processing on the pressure signal, or filtering on the pressure signal.

5. A waste sorting robot according to claim 1 wherein the controller determines a suction gripper status in dependence on the pressure signal.

6. A waste sorting robot according to claim 5 wherein the controller determines at least one of suction gripper or manipulator instructions in dependence of the suction gripper status.

7. A waste sorting robot according to claim 5 wherein the controller determines that the suction gripper status is one or more of the following:
the suction gripper is blocked,
an object has slipped off the suction gripper,
the suction gripper has failed to grip an object, or
the suction gripper is gripping an object,
based on at least one of the pressure signal, the position of manipulator, or the position of the suction gripper.

8. A waste sorting robot according to claim 1 wherein the waste sorting robot comprises a valve coupled to the controller and configured to selectively control a direction of airflow through the suction gripper.

9. A waste sorting robot according to claim 8 wherein the controller is configured to select an operative valve mode of the valve in dependence on at least one of the pressure signal, the position of the manipulator, or the position of the suction gripper.

10. A waste sorting robot according to claim 8 wherein the controller selects a blow valve mode to blow air through the suction gripper to at least one of unblock the suction gripper or blow an object from suction gripper.

11. A waste sorting robot according to claim 1 wherein the suction gripper is slidably mounted on the manipulator.

12. A waste sorting robot according to claim 11 wherein the controller reverses a direction of the manipulator away from the working area in dependence on the pressure signal.

13. A waste sorting robot according to claim 1 wherein the pressure signal comprises at least one of: a rate of change of the pressure in a suction cup of the suction gripper, a magnitude of the pressure in the suction cup, a negative pressure value, or a positive pressure value.

14. A waste sorting robot according to claim 1 wherein the at least one pressure sensor is one or more of the following: piezoelectric pressure sensor, electrostatic pressure sensor, piezoresistive pressure sensor, resonant pressure sensor, a pressure transducer, a Wheatstone bridge pressure transducer, a differential pressure transducer, a diaphragm pressure sensor, a inductive pressure sensor, a reluctive pressure sensor, or an optical pressure sensor.

15. A waste sorting robot according to claim 1 wherein the controller varies a suction force generated by the suction gripper in dependence of the pressure signal.

16. A waste sorting robot according to claim 1 wherein the at least one position sensor is one or more of an encoder in a servo, a camera, a proximity sensor, an optical sensor, an infrared sensor, an ultrasound sensor, a laser distance sensor, or a hall sensor.

17. A method of controlling a waste sorting robot comprising:
sending control instructions from a controller to a manipulator comprising a suction gripper configured to interact with one or more waste objects to be sorted within a working area, wherein the manipulator is moveable within the working area;
determining a pressure signal in dependence on a fluid pressure in the suction gripper with at least one pressure sensor in fluid communication with the suction gripper and connected to the controller;
determining a position signal with at least one position sensor mounted on the suction gripper in dependence on a position of the suction gripper; and
determining manipulator instructions in dependence on the pressure signal relating to the pressure of the suction gripper and the position signal relating to the position of the suction gripper.

18. The method according to claim 17, wherein the at least one pressure sensor is mounted on the suction gripper.

19. A waste sorting robot comprising:
a manipulator comprising a suction gripper configured to interact with one or more waste objects to be sorted within a working area, wherein the manipulator is moveable within the working area, and wherein the suction gripper is moveable relative to the manipulator between a first position and a second position;
a controller configured to send control instructions to the manipulator; and
at least one position sensor mounted on the suction gripper, the at least one position sensor configured to detect the suction gripper moving between the first and second positions;
wherein the controller is configured to actuate the suction gripper in dependence on a signal detecting the suction gripper has moved between the first and second positions.

20. The waste sorting robot of claim 19, wherein the manipulator further comprises a horizontal beam configured to move along a first axis, wherein the suction gripper is mounted to the horizontal beam and is movable along a second axis orthogonal to the first axis, and wherein the suction gripper is movable relative to the horizontal beam between a first position and a second position such that the manipulator is moveable within the working area along three axes.

* * * * *